United States Patent
Burd et al.

(10) Patent No.: US 7,076,786 B2
(45) Date of Patent: *Jul. 11, 2006

(54) STATE MANAGEMENT OF SERVER-SIDE CONTROL OBJECTS

(75) Inventors: Gary S. Burd, Kirkland, WA (US);
Kenneth B. Cooper, Seattle, WA (US);
Mark T. Anders, Bellevue, WA (US);
Scott D. Guthrie, Redmond, WA (US);
David S. Ebbo, Redmond, WA (US);
Ted A. Peters, Seattle, WA (US);
Stephen J. Millet, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 77 days.

This patent is subject to a terminal disclaimer.

(21) Appl. No.: 10/818,684

(22) Filed: Apr. 5, 2004

(65) Prior Publication Data
US 2004/0199577 A1 Oct. 7, 2004

Related U.S. Application Data

(63) Continuation of application No. 09/574,144, filed on May 18, 2000, now Pat. No. 6,757,900.

(51) Int. Cl.
*G06F 9/44* (2006.01)
(52) U.S. Cl. .................. 719/316; 719/318; 709/203
(58) Field of Classification Search ............... 719/310, 719/320, 316, 318; 709/200–205, 203
See application file for complete search history.

(56) References Cited

U.S. PATENT DOCUMENTS

| | | | |
|---|---|---|---|
| 3,937,925 A | 2/1976 | Boothroyd | |
| 3,956,615 A | 5/1976 | Anderson et al. | |
| 4,186,871 A | 2/1980 | Anderson et al. | |
| 4,807,154 A | 2/1989 | Scully et al. | |
| 4,847,785 A | 7/1989 | Stephens | |
| 4,949,300 A | 8/1990 | Christenson et al. | |
| 4,979,148 A | 12/1990 | Bush et al. | |
| 5,299,315 A | 3/1994 | Chin et al. | |
| 5,349,657 A | 9/1994 | Lee | |
| 5,388,156 A | 2/1995 | Blackledge, Jr. et al. | |

(Continued)

FOREIGN PATENT DOCUMENTS

EP 01 11 1679 12/2000

(Continued)

OTHER PUBLICATIONS

Dowd, Tyson et al., "Compiling Mercury to the .NET Common Language Runtime," Electronic Notes in Theoretical Computer Sciences 59 No. 1 (Netherlands) (2001), pp. 1-16.

(Continued)

*Primary Examiner*—William Thomson
*Assistant Examiner*—Van Hoa Nguyen
(74) *Attorney, Agent, or Firm*—Merchant & Gould P.C.

(57) ABSTRACT

The state of one or more server-side control objects is managed using a transportable state structure that is communicated between a web server and a client. The transportable state structure may include state information, hierarchical information, and an integrity code. Prior to a response to the client, the state information of one or more server-side control objects is recorded into the transportable state structure for transmission to the client in the response. The transportable state structure is then returned to the server and loaded into the server-side control objects to restore the hierarchy to its previous state.

14 Claims, 10 Drawing Sheets

U.S. PATENT DOCUMENTS

| | | |
|---|---|---|
| 5,465,332 A | 11/1995 | Deloye et al. |
| 5,517,655 A | 5/1996 | Collins et al. |
| 5,548,340 A | 8/1996 | Bertram |
| 5,550,560 A | 8/1996 | Kanada et al. |
| 5,604,908 A | 2/1997 | Mortson |
| 5,638,176 A | 6/1997 | Hobbs et al. |
| 5,640,449 A | 6/1997 | Worley et al. |
| 5,664,228 A | 9/1997 | Mital |
| 5,675,520 A | 10/1997 | Pitt, III et al. |
| 5,706,505 A | 1/1998 | Fraley et al. |
| 5,732,256 A | 3/1998 | Smith |
| 5,732,267 A | 3/1998 | Smith |
| 5,745,103 A | 4/1998 | Smith |
| 5,748,890 A | 5/1998 | Goldberg et al. |
| 5,774,670 A | 6/1998 | Montulli |
| 5,793,982 A | 8/1998 | Shrader et al. |
| 5,812,996 A | 9/1998 | Rubin et al. |
| 5,835,724 A | 11/1998 | Smith |
| 5,855,020 A | 12/1998 | Kirsch |
| 5,878,141 A | 3/1999 | Daly et al. |
| 5,878,282 A | 3/1999 | Mital |
| 5,897,622 A | 4/1999 | Blinn |
| 5,911,068 A | 6/1999 | Zimmerman et al. |
| 5,918,007 A | 6/1999 | Blackledge, Jr. et al. |
| 5,940,075 A | 8/1999 | Mutschler, III |
| 5,940,847 A | 8/1999 | Fein et al. |
| 5,953,524 A | 9/1999 | Meng et al. |
| 5,956,489 A | 9/1999 | San Andres et al. |
| 5,961,601 A | 10/1999 | Iyengar |
| 5,963,952 A | 10/1999 | Smith |
| 5,983,227 A | 11/1999 | Nazem et al. |
| 5,991,802 A | 11/1999 | Allard et al. |
| 6,006,230 A | 12/1999 | Ludwug et al. |
| 6,014,637 A | 1/2000 | Fell et al. |
| 6,014,666 A | 1/2000 | Helland et al. |
| 6,032,207 A | 2/2000 | Wilson |
| 6,038,551 A | 3/2000 | Barlow et al. |
| 6,067,578 A | 5/2000 | Zimmerman et al. |
| 6,072,664 A | 6/2000 | Aoyagi et al. |
| 6,076,108 A | 6/2000 | Courts et al. |
| 6,101,607 A | 8/2000 | Bachand et al. |
| 6,108,717 A | 8/2000 | Kimura |
| 6,115,744 A | 9/2000 | Robins |
| 6,121,968 A | 9/2000 | Arcuri et al. |
| 6,138,150 A | 10/2000 | Nichols et al. |
| 6,167,524 A | 12/2000 | Goodnow et al. |
| 6,178,461 B1 | 1/2001 | Chan |
| 6,185,608 B1 | 2/2001 | Hon et al. |
| 6,203,228 B1 | 3/2001 | Takenoshita et al. |
| 6,205,480 B1 | 3/2001 | Broadhurst et al. |
| 6,212,192 B1 | 4/2001 | Mirashrafi et al. |
| 6,218,958 B1 | 4/2001 | Eichstaedt et al. |
| 6,230,160 B1 | 5/2001 | Chan |
| 6,246,422 B1 | 6/2001 | Emberling et al. |
| 6,247,044 B1 | 6/2001 | Gosling et al. |
| 6,253,228 B1 | 6/2001 | Ferris et al. |
| 6,253,234 B1 | 6/2001 | Hunt et al. |
| 6,279,151 B1 | 8/2001 | Breslau et al. |
| 6,286,133 B1 | 9/2001 | Hopkins |
| 6,326,957 B1 | 12/2001 | Nathan et al. |
| 6,334,157 B1 | 12/2001 | Oppermann et al. |
| 6,343,148 B1 | 1/2002 | Nagy |
| 6,351,767 B1 | 2/2002 | Batchelder et al. |
| 6,353,447 B1 | 3/2002 | Truluck et al. |
| 6,354,477 B1 | 3/2002 | Trummer |
| 6,363,352 B1 | 3/2002 | Dailey et al. |
| 6,370,561 B1 | 4/2002 | Allard et al. |
| 6,373,841 B1 | 4/2002 | Goh et al. |
| 6,397,253 B1 | 5/2002 | Quinlan et al. |
| 6,401,099 B1 | 6/2002 | Koppolu et al. |
| 6,405,241 B1 | 6/2002 | Gosling |
| 6,412,008 B1 | 6/2002 | Fields et al. |
| 6,430,575 B1 | 8/2002 | Dourish et al. |
| 6,460,071 B1 | 10/2002 | Hoffman |
| 6,460,141 B1 | 10/2002 | Olden |
| 6,463,442 B1 | 10/2002 | Bent et al. |
| 6,480,894 B1 | 11/2002 | Courts et al. |
| 6,487,665 B1 | 11/2002 | Andrews et al. |
| 6,505,238 B1 | 1/2003 | Tran |
| 6,546,516 B1 | 4/2003 | Wright et al. |
| 6,557,038 B1 | 4/2003 | Becker et al. |
| 6,560,598 B1 | 5/2003 | Delo et al. |
| 6,560,618 B1 | 5/2003 | Ims |
| 6,560,639 B1 * | 5/2003 | Dan et al. ................. 709/218 |
| 6,564,251 B1 | 5/2003 | Katariya et al. |
| 6,591,272 B1 | 7/2003 | Williams |
| 6,606,418 B1 | 8/2003 | Mitchell et al. |
| 6,622,168 B1 | 9/2003 | Datta |
| 6,633,416 B1 | 10/2003 | Benson |
| 6,725,219 B1 | 4/2004 | Nelson et al. |
| 6,728,421 B1 | 4/2004 | Kokemohr |
| 6,920,480 B1 * | 7/2005 | Mitchell et al. ............ 709/203 |
| 2001/0054020 A1 | 12/2001 | Barth et al. |
| 2002/0004815 A1 | 1/2002 | Muhlestein et al. |
| 2002/0008703 A1 | 1/2002 | Merrill et al. |
| 2002/0083171 A1 | 6/2002 | Hoogenboom et al. |
| 2002/0108102 A1 | 8/2002 | Muhlestein et al. |
| 2002/0188890 A1 | 12/2002 | Shupps et al. |
| 2003/0009476 A1 | 1/2003 | Fomenko et al. |
| 2003/0009519 A1 | 1/2003 | Gosling et al. |
| 2003/0009567 A1 | 1/2003 | Farouk |
| 2003/0018827 A1 | 1/2003 | Guthrie et al. |
| 2003/0025728 A1 | 2/2003 | Ebbo et al. |
| 2003/0028565 A1 | 2/2003 | Landsman et al. |
| 2003/0074634 A1 | 4/2003 | Emmelmann |
| 2003/0097639 A1 | 5/2003 | Niyogi et al. |
| 2004/0003112 A1 | 1/2004 | Alles et al. |
| 2004/0003139 A1 | 1/2004 | Cottrille et al. |
| 2004/0003248 A1 | 1/2004 | Arkhipov |
| 2004/0073873 A1 | 4/2004 | Croney et al. |

FOREIGN PATENT DOCUMENTS

| | | |
|---|---|---|
| WO | WO 98/21651 | 5/1998 |
| WO | WO 98/44695 | 10/1998 |
| WO | WO 99/34288 A | 7/1999 |

OTHER PUBLICATIONS

Hannay, Phillip et al., "MSIL For the .NET Framework: The Next Battleground?", Virus Bulletin Conference, Sep. 2001, pp. 173-196.

Langheinrich, M., et al., "Unintrusive customization techniques for Web advertising," Computer Networks, vol. 31, No. 11-16. May 17, 1999, pp. 1259-1272.

Lee, C.-H., et al., "Web personalization expert with combining collaborative filtering and association rule mining technique," Expert Systems With Applications, Vo. 21, No. 3, Oct. 2001, pp. 131-137.

Li, W.-S., et al., "PowerBookmarks: a system for personalizable Web information organization, sharing, and management, "Computer Networks, vol. 31, No. 11-16, May 17, 1999, pp. 1375-1389.

Mobasher, B., "A Web personalization Engine Based on User Transaction Clustering," Proc. Of the 9th Annual Workshop on Information Tech. And Systems, Dec. 11, 1999, pp. 179-184.

"NCSA httpd" nttpd@ncsa.uluc.edu.

O'Leary, M., "Web personalization Does It Your Way," O'Leary Online, vol. 23, No. 2, Mar.-Apr. 1999, pp. 79-80.

Ramakrishnan, N., "PIPE: Web Personalization by Partial Evaluation," IEEE Internet Computing, vol. 4, No. 6, Nov.-Dec. 2000, pp. 21-31.

Seddon, Bill, "Generating XP Style webparts from a web control," The Code Project—Generating XP style webparts from a web control—ASP.NET, 10 pages.

Sells, Chris et al., "Generating Code at Run Time with Reflection.Emit," Windows Developer Magazine, Aug. 2002, vol. 13, No. 8, pp. 26-34.

Syme, Don, "ILX: Extending the .NET Common IL for Functional Language Interoperability," Electronic Notes in Theoretical Computer Science 59 No. 1 (2001), pp. 1-20.

Varela, Carlos A.; Caroline C. Hayes; "Providing Data on the Web: From Examples to Programs," Second International WWW Conference, Chicago, IL; Oct. 17, 1994; 17 pages.

European Search Report 01111678.7-2201.

European Search Report 01111680.3-2201.

European Search Report 01111681.1-2201.

European Search Report 01111682.9-2201.

"Alterego Networks Introduces First Mobile Web Server for Enterprises, Telcos and Providers"; Redwood City, CA; Nov. 14, 2000; 3 pages.

Anderson, Richard; Homer, Alex; Howard, Rob; Sussman, Dave; "A Preview of Active Server Pages+"; Copyright 2000, Wrox Press, pp. 1-73.

Developing ASP-Based Applications: Microsoft 1996, 5 pages.

"Bluestone Software Layes Foundation for Internet Operating Environment with Total-E-Server . . . " Screaming Media, Business Wire; Jun. 5, 2000; 3 pages.

Chapter 3, "Mechanics of Developing JavaScript Applications"; Server-Side Javascript Guide; Online! 1999; pp. 51-108.

Chapter 6, "Session Mangement Service"; Server Side Javascript Guide; Online! 1999 pp. 125-166.

"ColdFusion: Web Application Server"; Allair Corp; 1995-1999; 28 pages.

Custer, Helen; "Inside Windows NT"; Microsoft Press 1993; pp. 74-81.

Davulcu, Hasan; Freire, Juliana; Kifer, Michael; Ramakrishnan, I.V.; "A Layered Architecture for Querying Dynamic Web Content"; ACM 1999; pp. 491-502.

Dobson, Rick; "Data Binding In Dynamic HTML"; DBMS Mar. 1998 pp. 47-52.

Duan, Nick N.; "Distributed Database Access in a Corporate Environment Using Java" Bell Atlantic Corporation; 1996; 8 pages.

Esposito, Dino; "Heaven Sent"; Developer Network Journal issue 23 Mar./Apr. 2001 pp. 18-24.

Franklin, Keith; "Supercharge Data Binding"; Visual Basic Programmer's Journal, Mar. 2000; 7 pages.

Frost, Jim; "Windows NT Security"; May 4, 1995; 7 pages.

"Hammock: Think of it as Swing for the Web"; Jul. 14, 2000; 10 pages.

Hammond, Eric "Hammock Swings through Web interfaces" Jul. 14, 2000; 3 pages.

Holmes, John W.; e-Mail response to question regarding GET/POST.HTTP request, extracted from Google's News groups, php.general, Nov. 11, 2002.

Hovanes, Michael E.; Deal, John R. Grizz; Rowberg, Alan H.; "Seamless Multiresolution Display of Portable Wavelet-Compressed Images" Journal of Digital Imaging, vol. 12, No. 2, suppl 1(May 1999), pp. 109-111.

"HTML Encyclopaedia"; 1995-1998 2 pages.

Ingham; David B; "W3Objects: A Distributed Object-Oriented Web Server" Object-Oriented Web Servers and data Modeling Workshop, Sixth International World Wide Web Conference, Apr. 7, 1997, Santa Clara, CA 4 pages.

Kitayama, Fumihiko; Hirose, Shin-Ichi; Kondoh, Goh; Kuse, Kazushi; "Design of a Framework for Dynamic Content Adaptation to Web-Enabled Terminals and Enterprise Applications"; IEEE 1999, pp. 72-79.

Kunz, T.; El Shentenawy, M.; Gaddah, A.; Hafez, R.; Image Transcoding for Wireless WWW Access: The User Perspective; Multimedia Computing and Netorking 2002, Proceedings of SPIE vol. 467 (2002) pp. 28-33.

Marshall, James; "HTTP Made Really Easy: A Practical Guide to Writing Clients and Servers"; Aug. 15, 1997; 14 pages.

"A Brief History of Hypertext" Microsoft Corporation, 1996, 1 page.

Nadamoto, Akiyo; Kondo, Hiroyuki; Tanaka, Katsumi; "WebCarousel: Restructuring Web Search Results for Passive Viewing in Mobile Environments" IEEE 2001 p. 164-165.

"OOP Launches Hammock at JavaOne" Jun. 8, 2000, 1 page.

Pyarali, Irfan; O'Ryan, Carlos; Schmidt, Douglas; Wang, Nanbor; Gokhale, Aniruddha S.; Kachroo, Vishal; "Using Priciple Patterns to Optimize Real-Time ORB's" IEEE Concurrency, 2000, pp. 16-25.

Penn, Gerald; Hu, Jianying; Luo, Hengbin; McDonald, Ryan; "Flexible Web Document Analysis for Delivery to Narrow-Bandwidth Devices"; IEEE 2001; pp. 1074-1078.

Shapiro, Marc; "A Binding Protocol for Distributed Shared Objects" Presented at 14th International Conference on Distributed Comp. Sys.; Jun. 21-24, 1994; 17 pages.

Shi, Weisong; Collins, Eli; Karamcheti, Vijay; "Modeling Object Characteristics of Dynamic Web Content"; Proceedings of the IEEE Global Internet Conference, Nov. 2002, 5pgs.

Solomon, David A. "Inside Windows NT, Second Edition"; Microsoft Press 1998; pp. 310-319.

Stewart, Tony; "The Document as Application: Issues and Implications" GCA XML Europe 1999; pp. 575-599.

"Best Practices for Creating Adaptive User Interfaces with the Mobile Internet Toolkit"; Microsoft Corporation, Jan. 2002; 15 pages.

"Best Practices for the Microsoft Mobile Internet Toolkit Image Control"; Microsoft Corporation, Feb. 2002.

Wu, Dapeng; Hou, Yiwci Thomas; Zhang, Ya-Qin; "Scalable Video Transport over Wireless IP Networks"; IEEE 2000; pp. 1185-1191.

* cited by examiner

```
<html>
    <script runat=server>
        Overrides Sub Load()
            If (IsFirstLoad) Then
                Message.Text = "You've never visited this page before!"
            Else
                Message.Text = "Last visited: " & State("LastAccessed")
            End If
        Overrides Sub Save()
            State("LastAccessed") = Now
        End Sub
    </script>
    <body>
        <form runat=server>
            <span id="Message" runat=server/>
        </form>
    </body>
</html>
```

FIG. 6

```
<form>
    <input type=hidden name="__VIEWSTATE"value="<a2><s>-5120857414</s><a2>
<n><H1><K><i>2</i></K><V><a2><n><H1><K><i>1</i></K><V><a2><s>InnerHtml=5/16/99;
</s><n></a></V></H></a></V></H></a></a>">
    <input type=hidden name ="__VIEWSTATEMAC" value="4343433433">

<span id="Message">Last Post Back: 5/6/99</span>
</form>
```

FIG. 7

STATE MANAGEMENT OF SERVER-SIDE CONTROL OBJECTS

CROSS-REFERENCE TO RELATED APPLICATIONS

The present application is a continuation of U.S. patent application Ser. No. 09/574,144, entitled "State Management of Server-Side Control Objects", now U.S. Pat. No. 6,757,900 and filed on May 18, 2000.

The present application is further related to U.S. patent application Ser. No. 09/573,656, entitled DATABINDING USING SERVER-SIDE CONTROL OBJECTS, now U.S. Pat. No. 6,792,607; U.S. patent application Ser. No. 09/573,769, entitled SERVER-SIDE CONTROL OBJECTS FOR PROCESSING CLIENT-SIDE USER INTERFACE ELEMENTS, now U.S. Pat. No. 6,961,750; U.S. patent application Ser. No. 09/573,768, entitled SERVER-SIDE CODE GENERATION FROM A DYNAMIC WEB PAGE CONTENT FILE, now U.S. Pat. No. 6,990,653 and U.S. patent application Ser. No. 09/574,165, entitled POSTBACK INPUT HANDLING BY SERVER-SIDE CONTROL OBJECTS, presently awaiting the issuance of Letters Patent, assigned to the Assignee of the present invention.

TECHNICAL FIELD

The invention relates generally to a web server framework, and more particularly to managing the state of server-side control objects that process client-side user interface elements of a web page.

BACKGROUND OF THE INVENTION

A typical web browser receives data from a web server that defines the appearance and rudimentary behavior of a web page for display on a client system. In a typical scenario, a user specifies a Uniform Resource Locator ("URL"), which is a global address of a resource on the World Wide Web, to access a desired web site. Generally, the term "resource" refers to data or routines that can be accessed by a program. An example URL is "http://www.microsoft.com/ms.htm". The first part of the example URL indicates a given protocol (i.e., "http") to be used in the communication. The second part specifies the domain name (i.e., "www.microsoft.com") where the resource is located. The third part specifies the resource (i.e., a file called "ms.htm") within the domain. Accordingly, a browser generates an HTTP (HyperText Transport Protocol) request associated with the example URL to retrieve the data associated with ms.htm file within the www.microsoft.com domain. A web server hosting the www.microsoft.com site receives the HTTP request and returns the requested web page or resource in an HTTP response to the client system for display in the browser.

The "ms.htm" file of the example above includes static HTML (HyperText Markup Language) code. HTML is a plain-text authoring language used to create documents (e.g., web pages) on the World Wide Web. As such, an HTML file can be retrieved from a web server and displayed as a web page in a browser. Using HTML, a developer can, for example, specify formatted text, lists, forms, tables, hypertext links, inline images and sounds, and background graphics for display in the browser to present the rich graphical experience that users have come to expect while viewing information from the Internet. An HTML file, however, is a static file that does not inherently support dynamic generation of web page content.

If dynamic content is to be displayed, such as a change stock price or traffic information, a server-side application program is generally developed to handle the more complex client-server interaction. The server-side application program processes an HTTP request and generates the appropriate HTML code for transmission to the client in an HTTP response. An exemplary HTTP request may include parameters, such as data in a query string or data from web-based forms. As such, a server-side application program can process the parameters and dynamically generate HTML code in an HTTP response to the client. An exemplary server-side application program may dynamically generate documents containing appropriate HTML code using a sequence of one or more formatted text write operations to a memory structure. Thereafter, the resulting document is transmitted to a client system in an HTTP response, where it is displayed as a web page in the browser.

Developing a server-side application program can be a complex task requiring not only familiarity with normal HTML coding that is used to layout a web page, but also with programming basics, including one or more programming languages, (e.g., C++, Perl, Visual Basic, or Jscript). Web page designers, on the other hand, are frequently graphics designers and editors, who may lack programming experience. Furthermore, simplifying complex web page development can speed the development of new web content by any developer. Generally, development of a custom server-side application program also requires tremendous effort, so much, in fact, that developers are often disinclined to attempt it. It is desirable, therefore, to provide a development framework that allows a developer to dynamically create and process a web page with minimal programming.

One approach to minimize the programming requirements of dynamic web page generation has been the Active Server Page (ASP) framework, provided by Microsoft Corporation. An ASP resource typically includes Visual Basic or Jscript code, for example, to process an HTTP request that specifies the ASP resource as the desired resource and, thereafter, to generate the resulting HTML code in a HTTP response to the client. Furthermore, an ASP resource may reference pre-developed or third party client-side library components (e.g., client-side "ACTIVEX" controls) instead of requiring that the page developer write all components from scratch. However, in the current server-side application frameworks, the programming required to dynamically manage client-side user interface elements (e.g., text boxes, list boxes, buttons, hypertext links, images, sounds, etc.) within server-side applications can still require sophisticated programming skills and considerable effort. An unanswered problem exists in property encapsulating programming required to process user interface elements, so as to allow the web page developer to focus on other aspects of the web page.

Server-side processing of client-side user interface elements, however, may involve complex state management issues, which would typically fall to the server-side applications program. The state of a server-side processing module corresponding to the client-side user interface element represents the server-side module's properties and configuration. A stateless client/server model, however, dictates that in communications between client and server the server does not maintain the state of processes occurring between the client and the server, because the communications connection between the client and server may disappear unexpectedly.

SUMMARY OF THE INVENTION

In accordance with the present invention, the above and other problems are solved by providing encapsulated state management for server-side processing of client-side user interface elements in which the server does not maintain the state between requests. The operation of processing the client-side user interface element may include a state management operation, which relates to the state (i.e., the "viewstate") of one or more server-side control objects in a control object hierarchy. A server-side control object processes and generates a client-side user interface element for display on a web page. A hierarchy of server-side control objects may also cooperate to generate the resulting authoring language code, such as standard HTML, for display of a web page on a client. The client can be, for example, any browser that supports standard HTML or another authoring language.

To satisfy the stateless client/server model, state information of server-side control objects may be transported between the client and the server in a transportable state structure, rather than remaining on the server between HTTP requests. When the server receives an HTTP request from the client, the server extracts the state information from a transportable state structure from the HTTP request and distributes the state information to the appropriate individual control objects in the server-side hierarchy. The integrity of the transportable state structure may also be verified using a coded structure associated with the transportable state structure and generated from the state information.

A method for managing a state of a server-side control object corresponding to a client-side user interface element incorporated in a web page displayed on a client is provided. The server-side control object is created in the control object hierarchy to process the client-side user interface element. A transportable state structure is received from the client. The transportable state structure includes state information indicating a state value for at least one server-side control object in the control object hierarchy. The state information is extracted from the transportable state structure. The state value from the state information is loaded into property of the server-side control object, if the state value is associated with the server-side control object.

A computer program product for managing a state of a plurality of server-side control objects created in a control object hierarchy and corresponding to a plurality of client-side user interface elements incorporated in a web page displayed on a client is provided. A transportable state structure is received from the client includes state information associated with one or more server-side control objects in the control object hierarchy. The state information is serialized to extract a state value, an associated property data type, and hierarchical information for a property of a server-side control object. The server-side control object is located within the control object hierarchy based on the hierarchical information. The state value is loaded into the property of the server-side control object.

An article of manufacture is provided as a computer program product. An embodiment of a computer program product in accordance with the present invention includes a computer program storage medium readable by a computer system and encoding a computer program for executing a computer process managing a state of a server-side control object corresponding to a client-side user interface element incorporated in a web page displayed on a client. An alternative embodiment of a computer program product in accordance with the present invention includes a computer data signal embodied in a carrier wave by a computing system and encoding a computer program managing a state of a server-side control object corresponding to a client-side user interface element incorporated in a web page displayed on a client. A product generated by a process of the present invention is provided as authoring language code, containing a transportable state structure, transmitted to a client and interpreted by a browser on the client.

BRIEF DESCRIPTION OF THE DRAWINGS

FIG. 6 illustrates an exemplary portion of a dynamic content file (e.g., an ASP+ resource) in an embodiment of the present invention.

FIG. 7 illustrates resultant code generated by one or more server side control objects in response to the exemplary portion of the dynamic content file of FIG. 6.

DETAILED DESCRIPTION OF THE INVENTION

Figure 1:
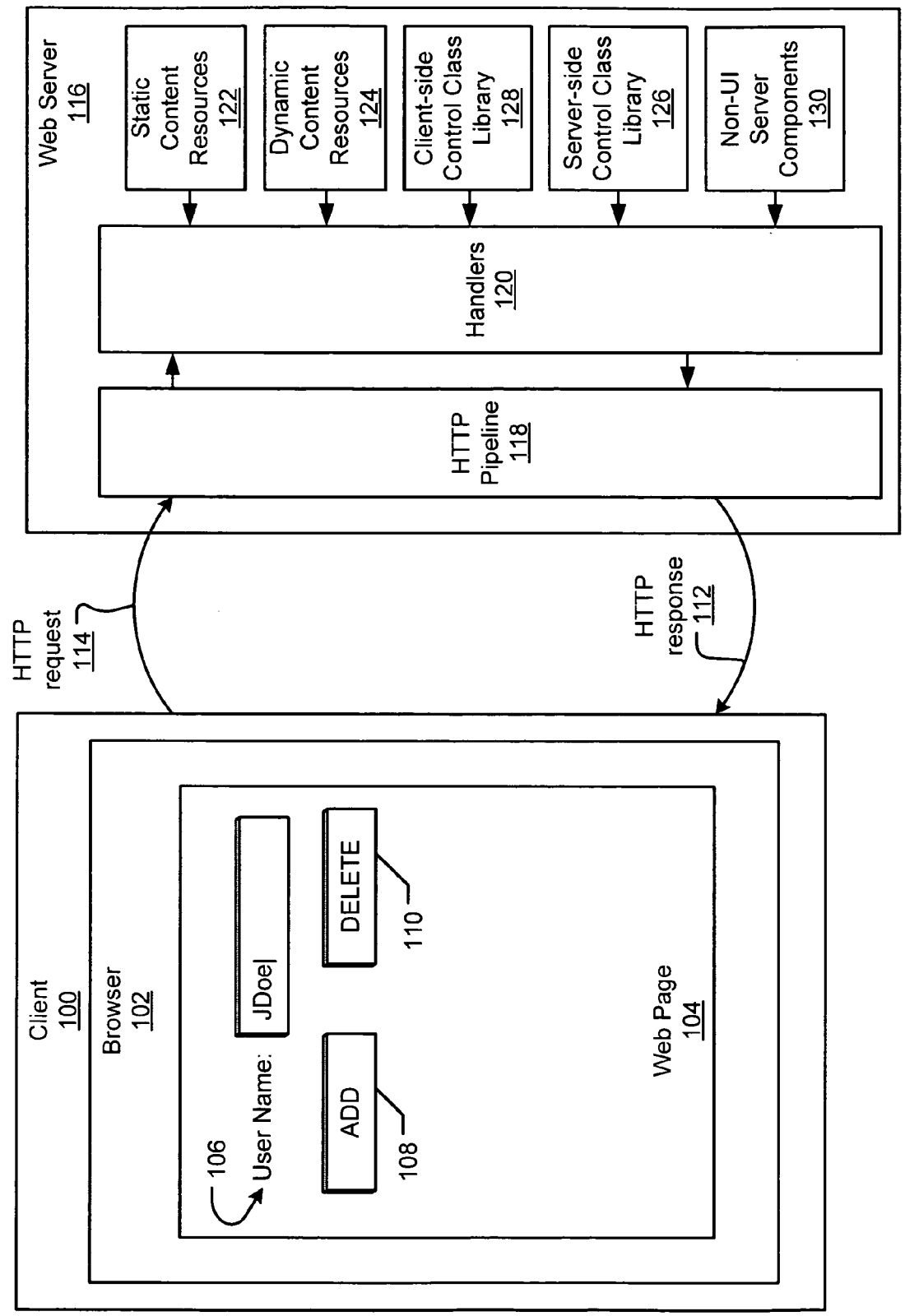
FIG. 1 illustrates a web server for dynamically generating web page content for display on a client in an embodiment of the present invention.

In an embodiment of the present invention, web page content is dynamically generated on a web server for display on a client. The client and the web server communicate across a network, for example, using HTTP requests and HTTP responses. As such, the web server generates web page content, which may be in the form of HTML code, and transmits the content to the client, which can display the web page in a browser. Server-side control objects, which logically correspond to individual user interface elements of the web page, are created on the web server to process and generate the web page content to be used by a client-side browser to display and process a web page. The server-side control objects are declared in a dynamic content file, such as an ASP+ resource, which is processed by a page factory to create a hierarchy of server-side control objects. The control objects in the hierarchy cooperate to process the request received from the client and then generate resulting web page content for transmission to the client, before the control objects in the hierarchy are terminated.

A page object may be instantiated as the top level of the control object hierarchy in an embodiment of the present invention. A page object, which is also a control object, typically contains one or more child control objects, and each child control object can contain one or more child control objects of its own to extend into a hierarchy of multiple levels. The page objects and descendent control objects execute a sequence of operations to process and generate the web content that corresponds to client-side user interface elements.

One of the operations in this sequence includes a load operation that deserializes the state information, which is received in a transportable state structure included in the request from the client, into the appropriate control object or objects in the hierarchy. A traversal operation of this load operation may walk through the control object hierarchy, following hierarchical information in the transportable state structure, to locate appropriate control objects in the hierarchy. In an embodiment of the present invention, the received state information includes only the states of control objects that have changed from their initial states (i.e., the state information includes only differential data). Alternative embodiments may include all states of all control objects in the hierarchy, whether changed or not, or some other combination of state information and hierarchical information for one or more server-side control objects.

Another operation of the sequence includes a save operation that serializes the state information from control objects having changed states. The state information is added to a transportable state structure for transmission to the client. The client may return the transportable state structure to the web server on a subsequent request to the web server. Upon receipt of the transportable state structure, the control object hierarchy is recreated and the load operation restores the hierarchy's state to that of the previous response.

In an alternative embodiment, the transportable state structure may not be transmitted to the client. Instead, the transportable state structure may remain in the server or be transferred to another resource location (e.g., another server). For example, in the case of load balancing, a first server may communicate with a browser in a first HTTP transaction, but a second server may communicate with the browser in a second HTTP transaction. Accordingly, the transportable state structure can be communicated from the first server to the second server to process the second HTTP transaction, thereby bypassing the client.

FIG. 1 illustrates a web server for dynamically generating web page content for display on a client in an embodiment of the present invention. A client 100 executes a browser 102 that displays a web page 104 on a display device of the client 100. The client 100 may include a client computer system having a display device, such as a video monitor. An "INTERNET EXPLORER" browser, marketed by Microsoft Corporation, is an example of a browser 102 in an embodiment of the present invention. Other exemplary browsers include without limitation "NETSCAPE NAVIGATOR" and "MOSAIC". The exemplary web page 104 incorporates a text box control 106 and two button controls 108 and 110. The browser 102 may receive HTML code in the HTTP response 112 from a web server 116 and displays the web page as described by the HTML code. Although HTML is described with reference to one embodiment, other authoring languages, including without limitation SGML (Standard Generalized Markup Language), XML (extensible Markup Language), and WML (Wireless Markup Language), which is an XML-based markup language, designed for specifying the content and user interfaces of narrowband wireless devices, such as pagers and cellular phones, are contemplated within the scope of the present invention. Furthermore, although standard HTML 3.2 is primarily disclosed herein, any version of HTML is supportable within the scope of the present invention.

The communications between the client 100 and the web server 116 may be conducted using a sequence of HTTP requests 114 and HTTP responses 112. Although HTTP is described with reference to one embodiment, other transport protocols, including without limitation S-HTTP, are contemplated within the scope of the present invention. On the web server 116, an HTTP pipeline module 118 receives an HTTP request 114, resolves the URL, and invokes an appropriate handler 120 for processing the request. In an embodiment of the present invention, a plurality of handlers 120 for handling different types of resources is provided on the web server 116.

For example, if the URL specifies a static content file 122, such as an HTML file, a handler 120 accesses the static content file 122 and passes the static content file 122 back through the HTTP pipeline 118 for communication to the client 100 in an HTTP response 112. Alternatively, in an embodiment of the present invention, if the URL specifies a dynamic content file 124, such as an ASP+ resource, a handler 120 accesses the dynamic content file 124, processes the contents of the dynamic content file 124, and generates the resulting HTML code for the web page 104. In an embodiment of the present invention, the resulting HTML code includes standard HTML 3.2 code. Generally, a dynamic content file is a server-side declaration datastore (e.g., an ASP+ resource) that can be used to dynamically generate the authoring language code that describes a web page to be displayed on a client. The HTML code for the web page is then passed through the HTTP pipeline 118 for communication to the client 100 in an HTTP response 112.

During its processing, a handler 120 can also access libraries of pre-developed or third party code to simplify the development effort. One such library is a server-side class control library 126, from which the handler 120 can instantiate server-side control objects for processing user interface elements and generating the resultant HTML data for display of a web page. In an embodiment of the present invention, one or more server-side control objects map to one or more user interface elements, visible or hidden, on the web page described in the dynamic content file 124. More details on server-side control objects for processing client-side server interface elements are described in U.S. patent application Ser. No. 09/573,769 entitled SERVER-SIDE CONTROL OBJECTS FOR PROCESSING CLIENT-SIDE USER INTERFACE ELEMENTS, incorporated herein by reference for all it discloses and teaches, filed concurrently herewith, and assigned to the Assignee of the present invention.

A second library, in contrast, is a client-side control class library 128, such as a library including "ACTIVEX" components from Microsoft Corporation. An "ACTIVEX" control is a COM ("Component Object Model") object that follows certain standards in how it interacts with its client and other components. A client-side "ACTIVEX" control, for example, is a COM-based component that can be automatically downloaded to a client and executed by a web browser on the client. Server-side ACTIVEX components (not shown) are COM-based components that may be implemented on a server to perform a variety of server-side functions, such as providing the server-side functionality of a stock price look-up application or database component. A more detailed discussion of ACTIVEX can be found in "Understanding ACTIVEX and OLE", David Chappell, Microsoft Press, 1996.

In contrast to "ACTIVEX" controls, a server-side control object in an embodiment of the present invention, being specified in a dynamic content resource 124, logically corresponds to a user interface element that is incorporated in the web page on the client. The server-side control object can also generate valid HTML code that can include, for example, an HTML tag and a locator referencing a given client-side "ACTIVEX" control. If the browser already has the code for the client-side "ACTIVEX" control within its storage system, the browser executes the "ACTIVEX" control within the web page on the client. Otherwise, the browser downloads the code for the "ACTIVEX" control from the resource specified by the locator and then executes the "ACTIVEX" control within the web page on the client. A server-side control object in an embodiment of the present invention can also raise events to a server-side "ACTIVEX" control used to implement a stock look-up application on the server.

A handler 120 also has access to one or more non-user-interface server components 130 that execute on the web server 116 or on another accessible web server. A non-user-interface server component 130, such as a stock price look-up application or database component, may be referenced in or associated with a dynamic content file 124 that is processed by a handler 120. Sever-side events raised by the control objects declared in the dynamic content file 124 may be processed by server-side code, which calls appropriate methods of the non-user-interface server component 130. As a result, the processing provided by the server-side control objects simplifies the programming of the non-user-interface server component 130 by encapsulating the processing and generation of the user interface elements of a web page, which allows the developer of the non-user-interface server component 130 to concentrate on the specific functionality of the application, rather than on user interface issues.

Figure 2:
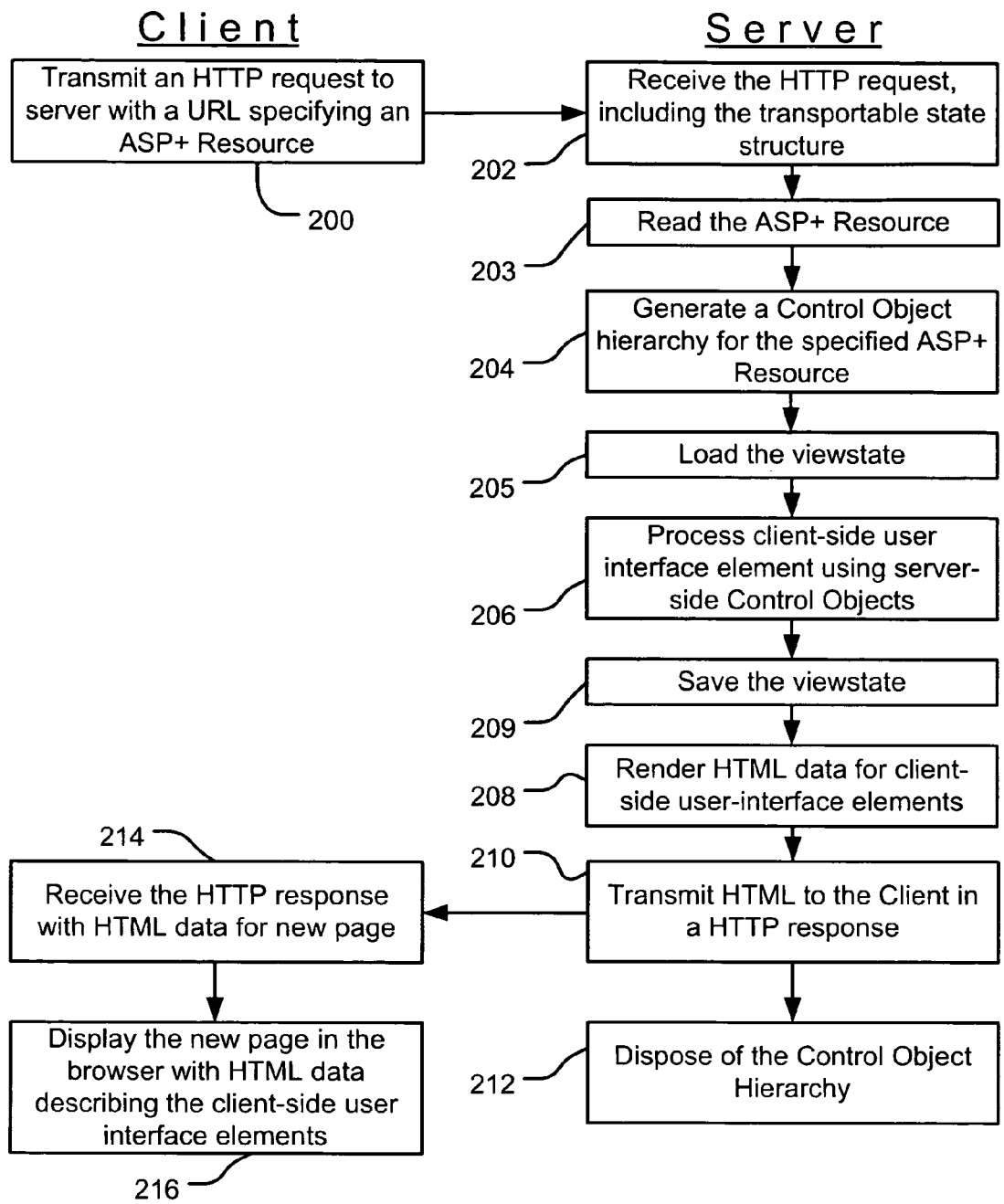
FIG. 2 illustrates a flow diagram of operations for processing and rendering client-side user interface elements using server-side control objects in an embodiment of the present invention.

FIG. 2 illustrates a flow diagram of operations for processing and generating client-side user interface elements using server-side control objects in an embodiment of the present invention. In operation 200, the client transmits an HTTP request to the server. The HTTP request includes a URL that specifies a resource, such as an ASP+ resource. In operation 202, the server receives the HTTP request and invokes the appropriate handler for processing the specified resource. The HTTP request includes a transportable state structure including state information, and optionally hierarchical information, associated with one or more server-side control objects, although the first HTTP request to a given page typically does not include a transportable state structure because no state changes have occurred at the server for the given page. In addition, the transportable state structure may include property data type information, and an integrity code to assist the server in validating the state information (i.e., verify that the state information was not corrupted at the client). Operation 204 generates a server-side control object hierarchy based on the contents of the specified dynamic content file (e.g., the ASP+ resource). The ASP+ resource is read in operation 203. Operation 205 loads state information received in the transportable state structure to the appropriate server-side control objects in the hierarchy to restore the control objects to their previous state.

In operation 206, the server-side control objects of the control object hierarchy perform one or more of the following operations: Postback event handling, postback data handling, state management, and data binding. Postback events and data (collectively "postback input") from user interface elements are communicated from the client to the server for processing. A postback event, for example, may include without limitation a "mouse click" event from a client-side button element or a "data change" event from a client-side textbox element that is communicated to the server. Postback data, for example, may include without limitation text entered by a user in a text box element or an index of an item selected from a drop-down box.

Operation 209 saves the property values, associated type information, and hierarchical information into a transportable state structure for transmission to the client. In operation 208, each server-side control object in the hierarchy is called to generate (or render) authoring language data, such as HTML code, for display of client-side user interface elements in the web page. Note that, although the term "render" may be used to describe the operation of displaying graphics on a user interface, the "render" is also used herein to describe the operation of generating authoring language data that can be interpreted by a client application, such as a browser, for display and client-side functionality. Rendering operation 208 also generates the authoring language data representing the transportable state structure. A more detailed discussion of the processing operation 206 and the rendering operation 208 is provided in association with FIG. 6. In a one embodiment, calls to render( ) methods in individual control objects are performed using a tree traversal sequence. That is, a call to the render( ) method of a page object results in recursive traversal throughout appropriate server-side control objects in the hierarchy. Alternative methods for calling the render( ) methods for appropriate control objets may also be employed, including an event signaling or object registration approach. The parentheses designate the "render( )" label as indicating a method, as compared to a data value.

In an embodiment of the present invention, the actual creation of the individual server-side control objects may be deferred until the server-side control object is accessed (such as when handling postback input, loading a state, rendering HTML code from the control object, etc.) in operations 206 or 208. If a server-side control object is never accessed for a given request, deferred control object creation optimizes server processing by eliminating an unnecessary object creation operation. More details on deferred control object creation and postback input handling are described in U.S. patent application Ser. No. 09/574,165, entitled POSTBACK HANDLING BY SERVER-SIDE CONTROL OBJECTS, presently awaiting the issuance of Letters Patent, incorporated herein by reference for all that it discloses and teaches, filed concurrently herewith, and assigned to the Assignee of the present application.

Operation 210 transmits the authoring language data (e.g., HTML code), including the transportable state structure, to the client in an HTTP response. In operation 214, the client receives the HTML code, including the transportable state structure, associated with the web page to be displayed. The transportable state structure may be stored at the client for return to the server in a subsequent HTTP request. In operation 216, the client system incorporates (e.g., displays) the user interface elements of the new page in accordance with the HTML code received from the HTTP response. It should be understood, however, that incorporation of a user-interface element may include non-display operations, such as providing audio or tactile output, reading and writing to memory, controlling the operation of scripts, etc. In operation 212, the server-side control object hierarchy is terminated. In an embodiment of the present invention, server-side control objects in the hierarchy are created in response to an HTTP request referencing an associated ASP+ resource, and destroyed subsequent to the rendering of authoring language data (e.g., HTML data). In an alternative embodiment, operation 212 may be performed after operation 208 and before operation 210.

Figure 3:
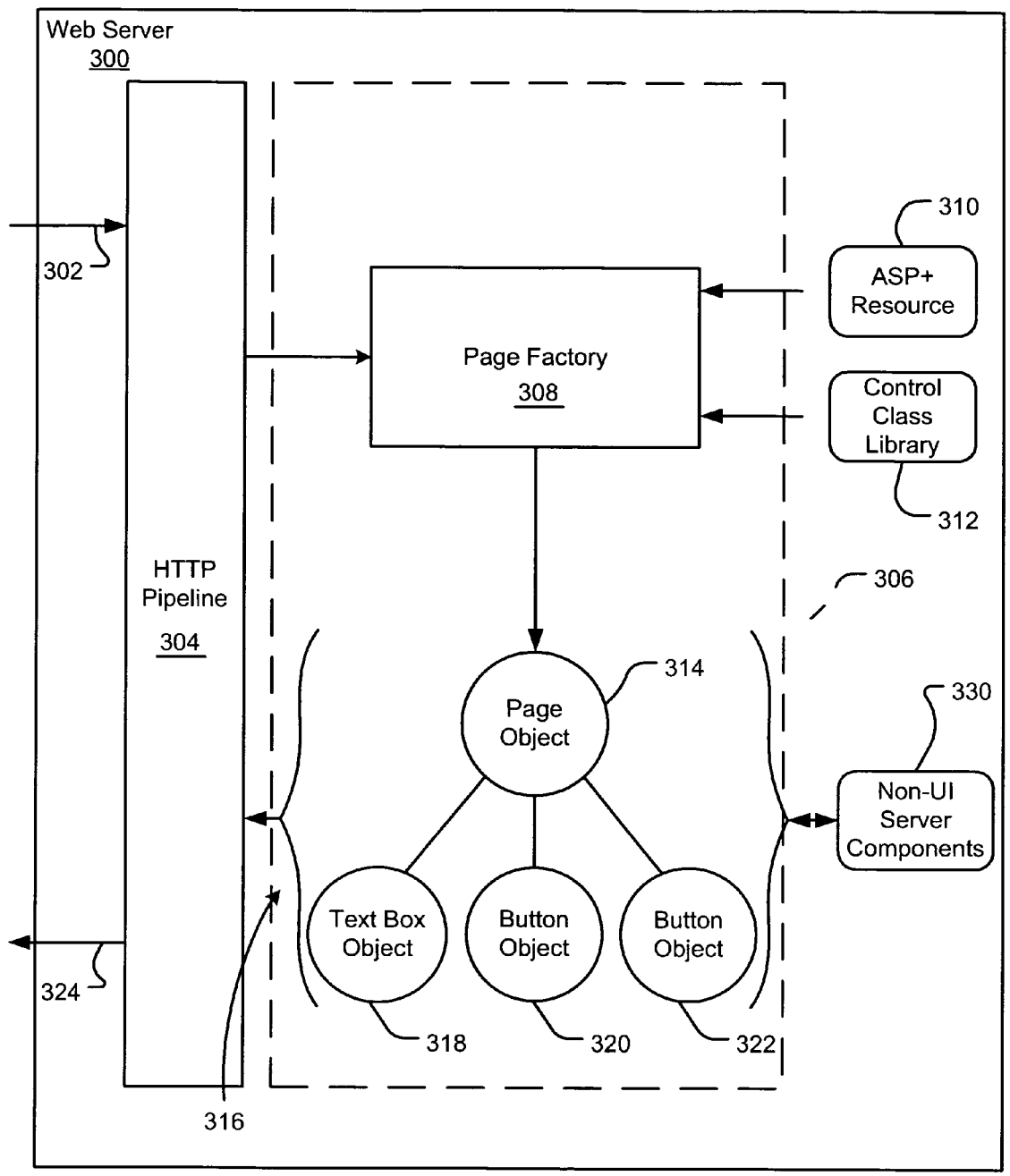
FIG. 3 illustrates exemplary modules in a web server used in an embodiment of the present invention.

FIG. 3 illustrates exemplary modules in a web server used in an embodiment of the present invention. The web server 300 receives an HTTP request 302 into the HTTP pipeline 304. The HTTP pipeline 304 may include various modules, such as modules for logging of web page statistics, user authentication, user authorization, and output caching of web pages. Each incoming HTTP request 302 received by the web server 300 is ultimately processed by a specific instance of an IHTTPHandler class (shown as handler 306). The IHTTP prefix indicates that the class is an Interface of an HTTP handler. The handler 306 resolves the URL request and invokes an appropriate handler factory (e.g., a page factory module 308).

In FIG. 3, a page factory module 308 associated with the ASP+ resource 310 is invoked to handle the instantiation and configuration of the objects declared in the ASP+ resource 310. In one embodiment, an ASP+ resource can be identified or referenced by designating a particular suffix (or file extension such as ".aspx") with a file. When a request for a given ".aspx" resource is first received by the page factory module 308, the page factory module 308 searches the file system for the appropriate file (e.g., the .aspx file 310). The file may contain text (e.g., authoring language data) or data in another format (e.g., bytecode data or encoded data) that may later be interpreted or accessed by the server to service the request. If the physical file exists, the page factory module 308 opens the file and reads the file into memory. If the file cannot be found, the page factory module 308 returns an appropriate "file not found" error message.

After reading the ASP+ resource 310 into memory, the page factory module 308 processes the file content to build a data model of the page (e.g., lists of script blocks, directives, static text regions, hierarchical server-side control objects, server-side control properties, etc.). The data model is used to generate a source listing of a new object class, such as a COM+ ("Component Object Model+") class that extends the page base class. The page base class includes code that defines the structure, properties, and functionality of a basic page object. The source listing is then dynamically compiled into an intermediate language. An intermediate language may include general or custom-built language code, such as COM+ IL code, Java bytecodes, Modula 3 code, SmallTalk code, and Visual Basic code. In an alternative embodiment, the intermediate language operations may be omitted, so that the native instructions are generated directly from the source listing or the source file (e.g., the ASP+ resource 310). A control class library 312 may be accessed by the page factory module 308 to obtain predefined server-side control classes used in the generation of the control object hierarchy.

The page factory module 308 outputs a page object 314, which is a server-side control object that corresponds to the web page 104 of FIG. 1. The page object 314 and its children (i.e., a text box object 318, a button object 320, and another button object 322) comprise an exemplary control object hierarchy 316. Other exemplary control objects are also contemplated in accordance with the present invention, including without limitation objects corresponding to the HTML controls in Table 1, as well as custom control objects. The page object 314 logically corresponds to the web page 104 or FIG. 1. The text box object 318 corresponds to the text box 106 in FIG. 1. Likewise, the button object 320 corresponds to the add button 108 in FIG. 1, and the button object 322 corresponds to the delete button 110 in FIG. 1. The page object 314 is hierarchically related to other control objects on the server. In one embodiment, a page object is a container object that hierarchically contains its children control objects. In an alternative embodiment, other forms of hierarchical relation may be employed, including a dependency relationship. In a more complex control object hierarchy with multiple levels of children, a child object can be a container object for other child objects.

In the illustrated embodiment, the control objects in the control object hierarchy 316 are created and executed on the server 3000, and each server-side control object "mirrors" a corresponding user interface element on the client. The server-side control objects of this embodiment also cooperate to handle input from the HTTP request 302, to manage the states of server-side control objects, to perform data binding with server-side databases, and to generate authoring language data (e.g., HTML code) used to display a resulting web page at a client. The resulting authoring language data is generated (i.e., rendered) from the server-side control object hierarchy 316 and transmitted to the client in an HTTP response 324. For example, resulting HTML code may embody any valid HTML construct and may reference ACTIVEX-type controls, JAVA applets, scripts, and any other web resources that yield client-side user interface elements (e.g., control buttons, text boxes, etc.) when processed by a browser.

By virtue of declarations made in the ASP+ resource 310, server-side control objects may access one or more non-user-interface server components 330 to provide interaction between the non-user-interface server component 330 and client-side user interface elements. For example, in response to postback input, server-side control objects can raise server-side events to the non-user-interface server components registered for those events. In this manner the non-user-interface server component 330 can interact with the user through user interface elements without programming the code required to display and process these elements.

In summary, an embodiment of the present invention includes server-side control objects that are created and executed on the server to generate HTML code that is sent to a client. The HTML code may, for example, embody any valid HTML constructs and may reference ACTIVEX-type controls, JAVA applets, scripts and any other web resources to produce user interface buttons and other user interface elements at the client. A user at the client may interact with these user interface elements, which logically correspond to the server-side control objects, and send a request back to the server. The server-side control objects are recreated on the server to process the data, events, and other characteristics of the user interface elements so as to generate the next round of HTML code to be transmitted in a response to the client.

Figure 4:
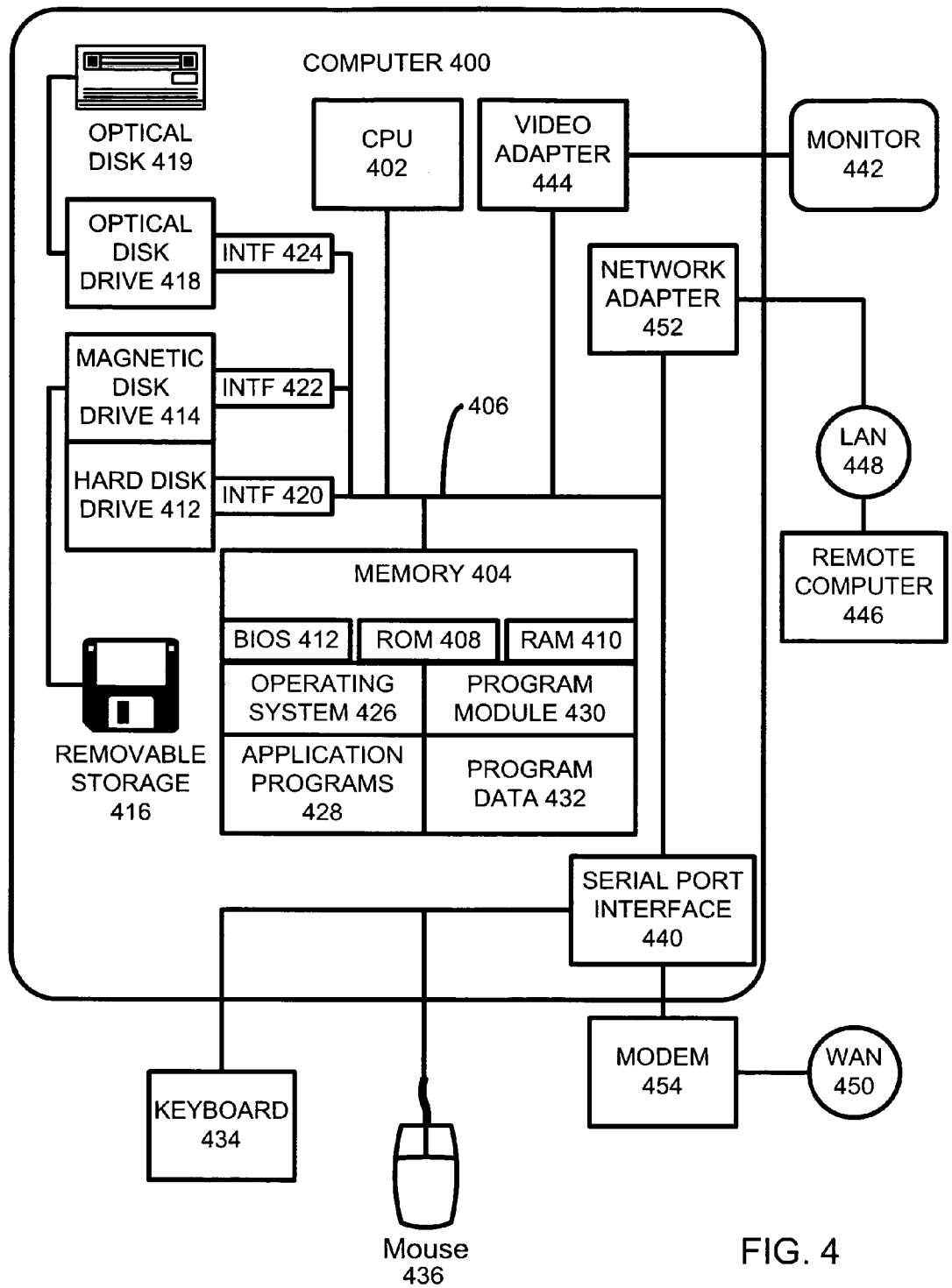
FIG. 4 illustrates an exemplary system useful for implementing an embodiment of the present invention.

With reference to FIG. 4, an exemplary computing system for embodiments of the invention includes a general purpose computing device in the form of a conventional computer system 400, including a processor unit 402, a system memory 404, and a system bus 406 that couples various system components including the system memory 404 to the processor unit 400. The system bus 406 may be any of several types of bus structures including a memory bus or memory controller, a peripheral bus and a local bus using any of a variety of bus architectures. The system memory includes read only memory (ROM) 408 and random access memory (RAM) 410. A basic input/output system 412 (BIOS), which contains basic routines that help transfer information between elements within the computer system 400, is stored in ROM 408.

The computer system 400 further includes a hard disk drive 412 for reading from and writing to a hard disk, a magnetic disk drive 414 for reading from or writing to a removable magnetic disk 416, and an optical disk drive 418 for reading from or writing to a removable optical disk 419 such as a CD ROM, DVD, or other optical media. The hard disk drive 412, magnetic disk drive 414, and optical disk drive 418 are connected to the system bus 406 by a hard disk drive interface 420, a magnetic disk drive interface 422, and an optical drive interface 424, respectively. The drives and their associated computer-readable media provide nonvolatile storage of computer readable instructions, data structures, programs, and other data for the computer system 400.

Although the exemplary environment described herein employs a hard disk, a removable magnetic disk 416, and a removable optical disk 419, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 416, optical disk 419, ROM 408 or RAM 410, including an operating system 426, one or more application programs 428, other program modules 430, and program data 432. A user may enter commands and information into the computer system 400 through input devices such as a keyboard 434 and mouse 436 or other pointing device. Examples of other input devices may include a microphone, joystick, game pad, satellite dish, and scanner. These and other input devices are often connected to the processing unit 402 through a serial port interface 440 that is coupled to the system bus 406. Nevertheless, these input devices also may be connected by other interfaces, such as a parallel port, game port, or a universal serial bus (USB). A monitor 442 or other type of display device is also connected to the system bus 406 via an interface, such as a video adapter 444. In addition to the monitor 442, computer systems typically include other peripheral output devices (not shown), such as speakers and printers.

The computer system 400 may operate in a networked environment using logical connections to one or more remote computers, such as a remote computer 446. The remote computer 446 may be a computer system, a server, a router, a network PC, a peer device or other common network node, and typically includes many or all of the elements described above relative to the computer system 400. The network connections include a local area network (LAN) 448 and a wide area network (WAN) 450. Such networking environments are commonplace in offices, enterprise-wide computer networks, intranets, and the Internet.

When used in a LAN networking environment, the computer system 400 is connected to the local network 448 through a network interface or adapter 452. When used in a WAN networking environment, the computer system 400 typically includes a modem 454 or other means for establishing communications over the wide area network 450, such as the Internet. The modem 454, which may be internal or external, is connected to the system bus 406 via the serial port interface 440. In a networked environment, program modules depicted relative to the computer system 400, or portions thereof, may be stored in the remote memory storage device. It will be appreciated that the network connections shown are exemplary, and other means of establishing a communication link between the computers may be used.

In an embodiment of the present invention, the computer 400 represents a web server, wherein the cpu 402 executes a page factory module on an ASP+ resource stored on at least one of storage media 416, 412, 414, 418, 419, or memory 404. HTTP responses and requests are communicated over the LAN 448 that is coupled to a client computer 446.

Figure 5:
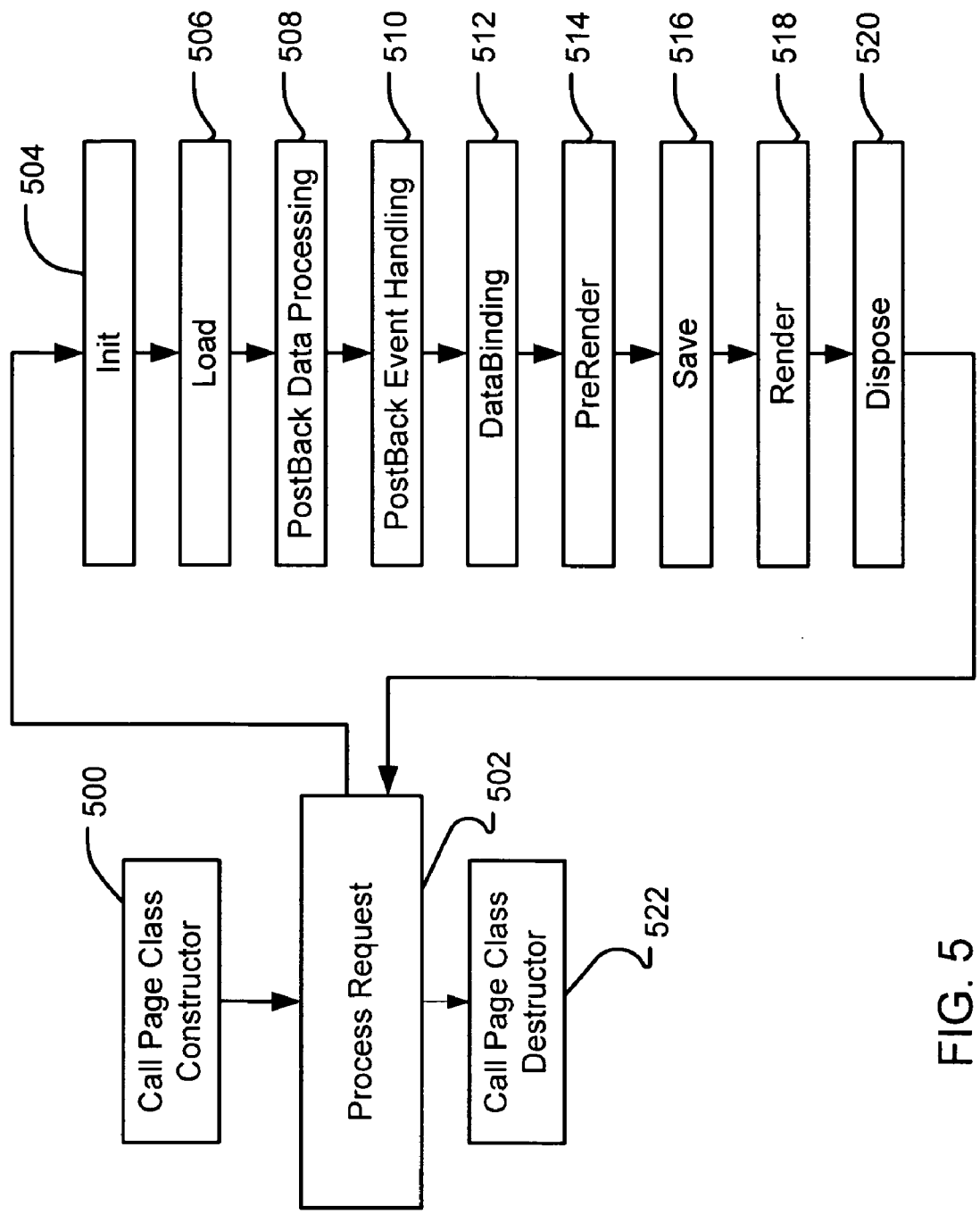
FIG. 5 illustrates a process flow diagram representing processing of a page object in an embodiment of the present invention.

FIG. 5 illustrates a process flow diagram representing server-side processing of a page object and other control objects in an embodiment of the present invention. In operation 500, a page object constructor is called by the page factory module 308 (see FIG. 3). As a result, a page object (see e.g., the page object 314 in FIG. 3) is created to "mirror" the web page user interface element on the client. In operation 502, the page factory module calls the ProcessRequest member function of the page object, which initiates the staged operations for processing the HTTP request received from a client. In a first stage of one embodiment of the present invention, a server-side Create Operation (not shown) may create the descendant server-side control objects contained in the control object hierarchy of the page object, that is, constructors for child control objects are recursively called to create the control objects during the lifetime of the processing of the HTTP request processing.

In an alternate embodiment, however, creation of child control objects is deferred until the control object is required for a given processing step (e.g., handling a postback event, handling postback data, loading or saving a viewstate, resolving data binding, or rendering HTML code for the corresponding user interface element). The latter embodiment, which is said to implement, "deferred control object creation", is an optimization that can alleviate unnecessary CPU and memory utilization. For example, a user input event received from the client may result in the creation of a completely different web page. In this case, it is unnecessary to instantiate an entire control object hierarchy of the previous page only to process an event that immediately results in the termination of the control object hierarchy and the instantiation of a new and different control object hierarchy for a new page.

In response to the server call to the page object's ProcessRequest method, operations 504 through 520 may be executed by the page object and by individual descendant control objects, depending in part on the data of a given HTTP request. In an embodiment of the present invention, the operations 504–520 are performed for each individual object in the order illustrated in FIG. 5; however, a given operation for one object may occur out of order or not at all with respect to a given operation of another object, depending on the HTTP request. For example, a first object may perform its Init operation 504 and its Load operation 506, and begin postback data processing operation 508, before a descendant control object performs its own Init operation 504 and Load operation 506 by virtue of deferred control object creation. The order of operation processing by the page object and the descendent control objects depends on various factors, including without limitation the nature of the data in the HTTP request, the configuration of the control object hierarchy, the current state of the control objects, and whether deferred control object creation is implemented.

The Init operation 504 initializes a control object after it is created by executing any server-side code associated with initialization in the dynamic content file. In this manner, each server-side control object may be customized with specific server-side functionality that is declared in the dynamic content file. In an embodiment of the present invention, dynamic content code intended to customize or extend the base page control classes as declared by the page developer in the ASP+ resource on the server. When the ASP+ resource is compiled, the declared code is included in the appropriate initialization code (e.g., the Init( ) methods of the page object and the descendent control objects). The Init operation 504 executes this code to customize or extend the page base class and the base classes for descendent control objects.

In an embodiment of the present invention, state management of the server-side control objects is supported in a Load operation 506 and a Save operation 516, which use a transportable state structure to accommodate the stateless model for client server systems by restoring server-side control objects to their previous states. In one embodiment, the state is communicated to and from the server in one or more hidden HTML fields of an HTTP request/response pair, although other transportable state structures are contemplated within the scope of the present invention, including cookies and visible fields.

In a given sequence of requests and responses relating to the current page between a client and a server, the states of one or more control objects are recorded into a transportable state structure by the Save operation 516 after the processing of a previous request. In an embodiment of the present invention, additional state information is also included in the transportable state structure, including hierarchical information or control object identifiers to allow the server to associate a given state with the appropriate control object. In a subsequent HTTP request, the state information is returned to the server in the transportable state structure. The server extracts the state information from the received transportable state structure and loads the state data into the appropriate control objects within the control object hierarchy to restore each control object to its state as it existed prior to a previous HTTP response. After the current request is processed, the states of one or more server-side control objects are again recorded into the transportable state structure by the Save operation 516, and the transportable state structure is returned to the client in the next HTTP response.

As a result of the Load operation 506, each server-side control object is placed in a state consistent with its state prior to a previous HTTP response. For example, if a text box control object includes a property value equaling "JDoe" prior to a previous HTTP response, the Load operation 506 restores the same control object to its previous state, in part by loading the text string "JDoe" into the property value. In addition, whether the state of a given object is stored and restored is configurable.

In summary of one embodiment of the present invention, the state of one or more server-side control objects is "saved" after processing. The saved state information is transmitted to the client in a response. The client returns the saved state information to the server in a subsequent response. The server loads the state information a freshly instantiated server-side control object hierarchy, such that the state of the hierarchy is restored to its previous state.

An alternative embodiment may maintain the state information on the server or at some other web location accessible by the server during the round trip from the server to the client, and then back to the server. After the client request is received by the server, this state information may be retrieved by the server and loaded into the appropriate server-side control object(s) in the control object hierarchy.

In operation 508, postback data received from the HTTP request is processed. Postback data may be included in the payload of the HTTP request in key-value pairs, in a hierarchical representation (e.g., XML), or in other data representations, such as RDF ("Resource Description Framework"). Operation 508 parses the payload to identify a unique identifier of a server-side control object. If the identifier (e.g. "page1:text1") is found and the identified server-side control object exists in the control object hierarchy, the corresponding postback data is passed to the control object. For example, referring to FIG. 1, a unique identifier associated with textbox 106 and the text "JDoe" are communicated in the payload of the HTTP request 114 to the web server 116. Operation 508 parses the payload of the HTTP request 114 and obtains the unique identifier of the textbox 106 and its associated value (i.e., "JDoe"). Operation 508 then resolves the unique identifier of the textbox 106 to identify the corresponding server-side control object and passes the "JDoe" value to the object for processing.

As discussed with regard to the Load operation 506, the property values of server-side control objects may be restored to their previous states. In response to the receipt of postback data, the server-side control object determines whether the passed-in postback value causes a change from the corresponding property's previous value. If so, the change is logged in a change list to indicate a data change for the associated control object. After all postback data has been processed within the control object hierarchy, a call may be made to a control object method to raise one or more postback data changed events to one or more non-user-interface server components, such as a stock price look-up application running on the server. An example of a postback data changed event is an event indicating that postback data has caused a property of a server-side control object to change. In an exemplary embodiment, such an event can be sent to a system-provided event queue so that a server component that is registered to process the event may be invoked. In this manner, a server-side non-user-interface server component can respond to events triggered by a change in data of a server-side control object. Alternative methods of implementing events are also contemplated in the scope of the present invention, including using application-provided event queues, polling, and processing interrupts.

In operation 510, postback events are handled. Postback events are communicated in the payload of the HTTP request. Operation 510 parses a specified event target (e.g., labeled "_EVENT TARGET" in an embodiment of the present invention) identifying the server-side control object to which the event is directed. Furthermore, operation 510 parses the located event arguments, if any, and provides the vent argument (e.g., labeled "_EVENTARGUMENT" in an embodiment of the present invention) to the specified server-side control object. The control object raises its events for processing by the non-user-interface server component (e.g., a server-side stock price look-up applications) associated with the dynamic content file. More details of postback data and postback event handling are described in the previously incorporated U.S. patent application Ser. No. 09/574,165, entitled POSTBACK INPUT HANDLING BY SERVER-SIDE CONTROL OBJECTS, presently awaiting the issuance of Letters Patent.

Operation 512 resolves data binding between the server-side control objects and one or more databases accessible by the server. In an embodiment of the present invention, properties of server-side control objects may be associated (or data bound) to properties of a parent data binding container, such as a table in a server-side application database. During the data binding operation 612, the page framework may update a data bound control object property with the value of the corresponding parent data binding container property. In this manner, user interface elements on the web page of the next response accurately reflect updated property values, because the control object properties to which the user interface elements corresponds have been automatically updated to the data binding operation 512. Likewise, control object properties can also be updated to the parent data binding container fields, thereby updating a server-side application database with postback input from a server-side control object. More details regarding data binding using server-side control objects are described in U.S. patent application Ser. No. 09/573,656, entitled DATABINDING USING SERVER-SIDE CONTROL OBJECTS, now U.S. Pat. No. 6,792,607, incorporated herein by reference for all that it discloses and teaches, filed concurrently herewith, and assigned to the Assignee of the present application.

Operation 514 performs miscellaneous update operations that may be executed before the control object state is saved and the output is rendered. Operation 516 requests state information (i.e., viewstate) from one or more control objects in the control object hierarchy and stores the state information for insertion into a transportable state structure that is communicated to the client in the HTTP response payload. For example, a "grid" control object may save a current index page of a list of values so that the "grid" control object may be restored to this state after a subsequent HTTP request (i.e., in operation 506). As described above, the view state information represents the state of the control object hierarchy prior to any subsequent actions by the client (e.g., before the HTTP response is sent to the client). When the view state information is returned, it will be used to place the control object hierarchy in that previous state prior to processing any client postback input or databinding.

The render operation 518 generates the appropriate authoring language output (e.g., HTML data) for communication to the client in an HTTP response. Rendering is accomplished through a top-down hierarchical tree walk of all server-side control objects and embedded rendering code. Operation 520 performs any final cleanup work (e.g., closing files or database connections) before the control object hierarchy is terminated. Processing then returns to operation 502 and proceeds to operation 522 where the page object is terminated by calling its destructor.

FIG. 6 illustrates an exemplary portion of a dynamic content file (e.g., an ASP+ resource) in an embodiment of the present invention. Line 1 of the ASP+ resource 600 is a start tag of an HTML file and is declared in the ASP+ resource 600 as a literal. A literal corresponds to a server-side literal control object in the server-side control object hierarchy. The literal control object corresponding to line 1 is given an index of "0" because it is the first control object resulting from a declaration in the ASP+ resource 600. At render time, the literal control object merely generates the "<html>" text and a new line for inclusion in the HTTP response. Lines 2 through 12 of the ASP+ resource 600 represent a code declaration block, which is executed on the server (i.e., as indicated by the "runat=server" attribute on line 2). In the exemplary ASP+ resource 600, the code declaration block does not result in the instantiation of a server-side control object in the control object hierarchy. Instead, the code declaration block results in server-side code being "wired" to or associated with the server-side control object declared in line 15. Line 13 of the ASP+ resource 600 is a start tag of the body of the HTML file and is declared in the ASP+ resource 600 as a literal to result in a literal control object having an index equaling "1".

The declaration on line 14 declares a server-side form control object (index="2") that is to be instantiated into the control object hierarchy. The tags on line 17 and 18 are closing tags to be represented by a server-side literal control object (index="3") in the control object hierarchy. The closing tag on line 16 closes the <form> declarations corresponding to the form control object.

In a subsequent level of hierarchy, the declaration on line 15 declares a server-side label control object (index="1") using the HTML control tag "span" and having the identifier attribute ("id") equaling "Message". Indices "0" and "2" of this level of hierarchy are allocated respectively to a literal control object (index="0") for a preceding white space literal (e.g., tabs, new lines, spaces, etc.) and a literal control object (index="2") of a subsequent white space literal.

FIG. 7 illustrates resultant code generated by one or more server side control objects in response to the exemplary portion of the dynamic content file of FIG. 6. Only the form, state management, and span sections are illustrated in an HTML code portion 700 to facilitate this discussion. Other tags, such as the <html> and <body> tags, are not included in the HTML code portion 700, although the HTML code for these tags would be included in a set of complete HTML code resulting from the ASP+ resource of FIG. 6.

Lines 1 and 5 are starting and ending tags of the form section of the HTML code and are generated by the server-side form control objects declared at lines 14 through 16 of FIG. 6. Line 4 includes the HTML code for a label displaying the date of the Last Post Back operation (i.e., "Last Post Back: 5/6/99"), which was declared in line 15 of FIG. 6.

The hidden fields on lines 2 and 3 represent an embodiment of a transportable state structure in accordance with the present invention. On line 2, the state information of the server-side control objects declared in the ASP+ resource 600 is recorded in the hidden field named "_VIEWSTATE". The value of the _VIEWSTATE field is a text string representing the state values, property types, and hierarchical information of the control objects in the control object hierarchy. Hierarchical information is also included in the _VIEWSTATE field to allow the Load operation to traverse the hierarchy and load a given state value into a property of an appropriate control object in the hierarchy.

In an embodiment of the present invention, a client interacts with a web server using a sequence of HTTP request/response pairs. Between a response to the client and the next request received by the server, the server may not maintain the state of the server-side control objects associated with a given ASP+ resource or a given connection with the client. Instead, the state information for a given control object hierarchy is sent to the client in a transportable state structure (e.g., in the HTTP response), and returned to the server in the transportable state structure (e.g., in the next HTTP request).

Line 3 represents a hidden field named "_VIEWSTATEMAC" having a value of "434333433". The _VIEWSTATEMAC is an integrity code in the transportable state structure that is used by the Load operation to verify that the _VIEWSTATE value was not corrupted at the client. The _ VIEWSTATEMAC value is initially calculated at the server from the contents of the _VIEWSTATE value and communicated to the client in a response. When the client returns the transportable state structure, the web server calculates a new integrity code from the contents of the received _VIEWSTATE value. If the received integrity code and the newly calculated code are equal, then the web server assumes that the received _VIEWSTATE value is valid or otherwise uncorrupted (i.e., is the same as the _VIEWSTATE value that was previously sent to the client). In an embodiment of the present invention, an MD5 algorithm is used to calculate the integrity code. MD5 is an algorithm created in 1991 by Professor Ronald Rivest for use in creating digital signatures. MD5 is a one-way hash function, meaning that it takes a message and converts it into a fixed string of digits, also called a message digest. Such methods may include the use of a secret key to discourage tampering by unauthorized individuals or programs. Other embodiments, however, may include alternative integrity coding techniques, including generating a code based on the MD4 algorithm or any other hash algorithm, or the length of the _VIEWSTATE field.

In an embodiment of the present invention, the structure of the _VIEWSTATE field of line 2 represents a hierarchical nesting of control objects and their states (e.g., state values and their associated property data types). The tags used in an exemplary _VIEWSTATE field are described in Table 1. Tags that include a "/" character represent closing tags.

TABLE 1

| Tag | Description |
| --- | --- |
| <s>, </s> | string value |
| <ax>, </a> | array having x elements |
| <i> | integer value |
| <hx>, </H> | hash table having x table entries |
| <K>, </K> | hash table key |
| <V>, </V> | hash table value |
| <b>, </b> | Boolean value |
| <d>, </d> | date/time value |
| <c>, </c> | currency value |
| <A>, </A> | array list |
| <n>, </n> | null value |

It should be understood that an exemplary encoding embodiment is disclosed herein, although in alternative embodiments, other encoding methods may be employed. For example, hierarchy information, state values and their associated property data types may be designated using unique hierarchical identifiers for each server-side control object, or an XML-related data format may be employed to represent the data in a transportable state structure. In addition, known encryption and compression techniques may be use to provide security and to reduce the size of the transportable state structure.

Figure 8:
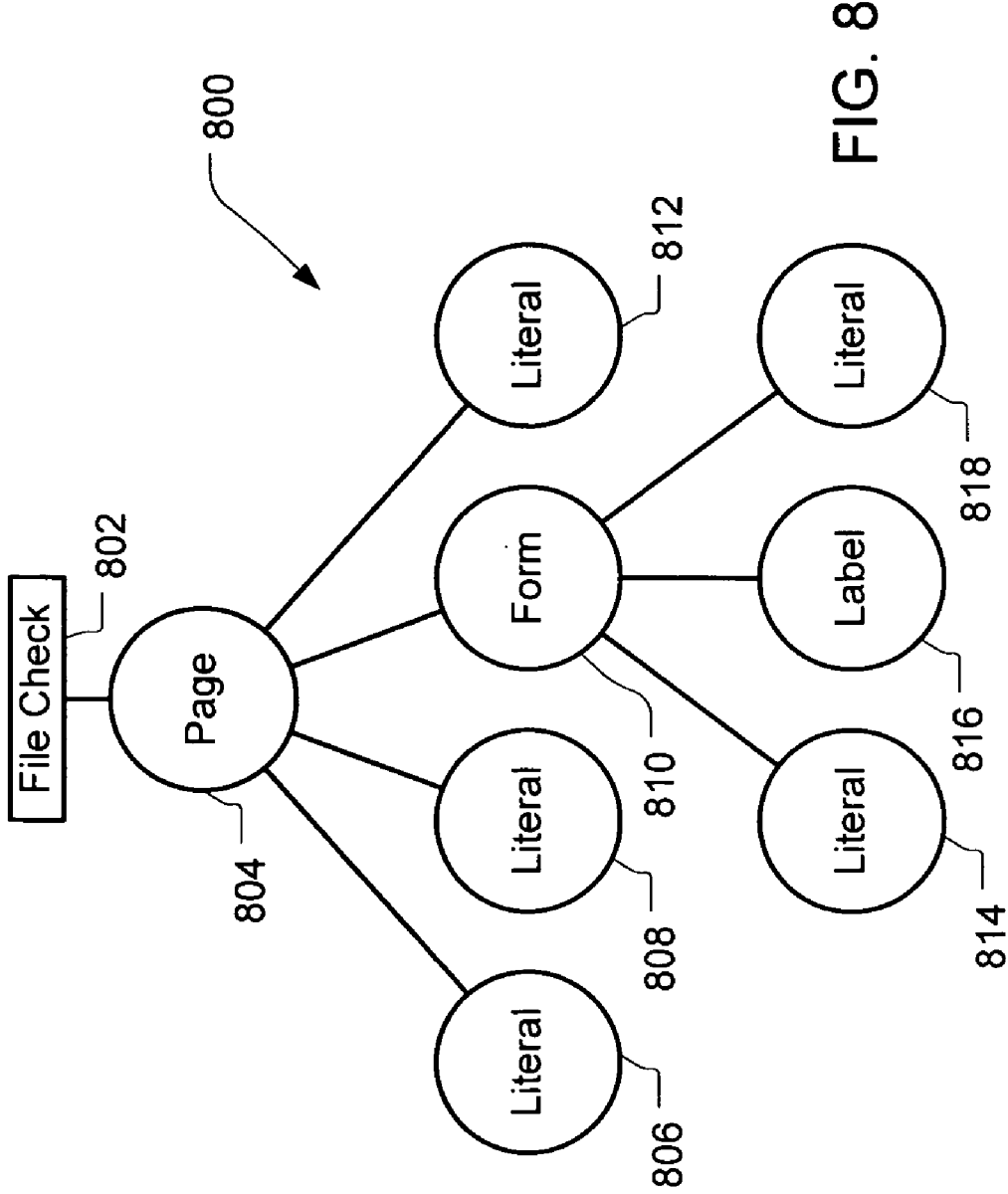
FIG. 8 illustrates the control object hierarchy corresponding to the ASP+ resource of FIG. 6 and the _VIEWSTATE field value of FIG. 7.

FIG. 8 illustrates the control object hierarchy corresponding to the ASP+ resource of FIG. 6 and the _VIEWSTATE field value of FIG. 7 in an embodiment of the present invention. A file check block 802, while not a control object component of the control object hierarchy, is illustrated as a top level of hierarchy based on the _VIEWSTATE field structure, such as shown in FIG. 7. A more detailed description of the file check block 802 is provided with regard to FIG. 9. Alternatively, omitting the file check block 802 or merging it into the level of hierarchy corresponding to a page control object 804 is contemplated within the scope of the present invention.

The page control object 804 corresponds to a special control object instantiated as the top level of the control object hierarchy and corresponding to the resulting web page itself. In an embodiment of the present invention, no specific declaration (i.e., a declaration having the "runat=server" attribute) is required to cause an instantiation of the page object 804.

At the next level of hierarchy, control objects 806, 808, 810, and 812 are instantiated as child control objects contained by or hierarchically related to the page object 804. Each control object in a level of hierarchy is assigned a zero-based index based on its top-down order in the ASP+ resource. For example, literal control object 806 corresponds to the "<html>" text and associated white spaces on line 1 of the ASP+ resource 600 in FIG. 6. Accordingly, the literal control object 806 is assigned an index equaling "0". In the illustrated embodiment of the present invention, the code declaration block extending from lines 2–12 does not result in the instantiation of a corresponding control object. The literal control object 808 corresponds to the "<body>" text and associated white space on line 13 of the ASP+ resource 600 of FIG. 6. Accordingly, the literal control object 808 is assigned an index equaling "1". The form control object 810 corresponds to the form declaration on lines 14 through 16 of the ASP+ resource 600 of FIG. 6. Accordingly, the form control object 810 is assigned an index equaling "2". The literal control object 812 corresponds to the closing tags and associated white space on lines 17 and 18 of the ASP+ resource 600 of FIG. 6. Accordingly, the literal control object 812 is assigned an index equaling "3".

At the next level of hierarchy, control objects 814, 816 and 818 are instantiated as child control objects contained by or hierarchically related to the form control object 810. The literal control object 814 corresponds to white space preceding the span declaration on line 15 of the ASP+ resource 600 of FIG. 6. Accordingly, the literal control object 814 is assigned an index of "0", because it is the first literal text (albeit white space) encountered in association with this level of hierarchy in the ASP+ resource. Likewise, the literal control object 818 corresponds to white space following the span declaration of line 15 in the ASP+ resource 600 of FIG. 6. Accordingly, the literal control object 818 is assigned an index of "2". The label control object 816 corresponds to the declaration on line 15 of the ASP+ resource 600 in FIG. 6. Accordingly, the label control object 816 is assigned an index equaling "1".

Figure 9:
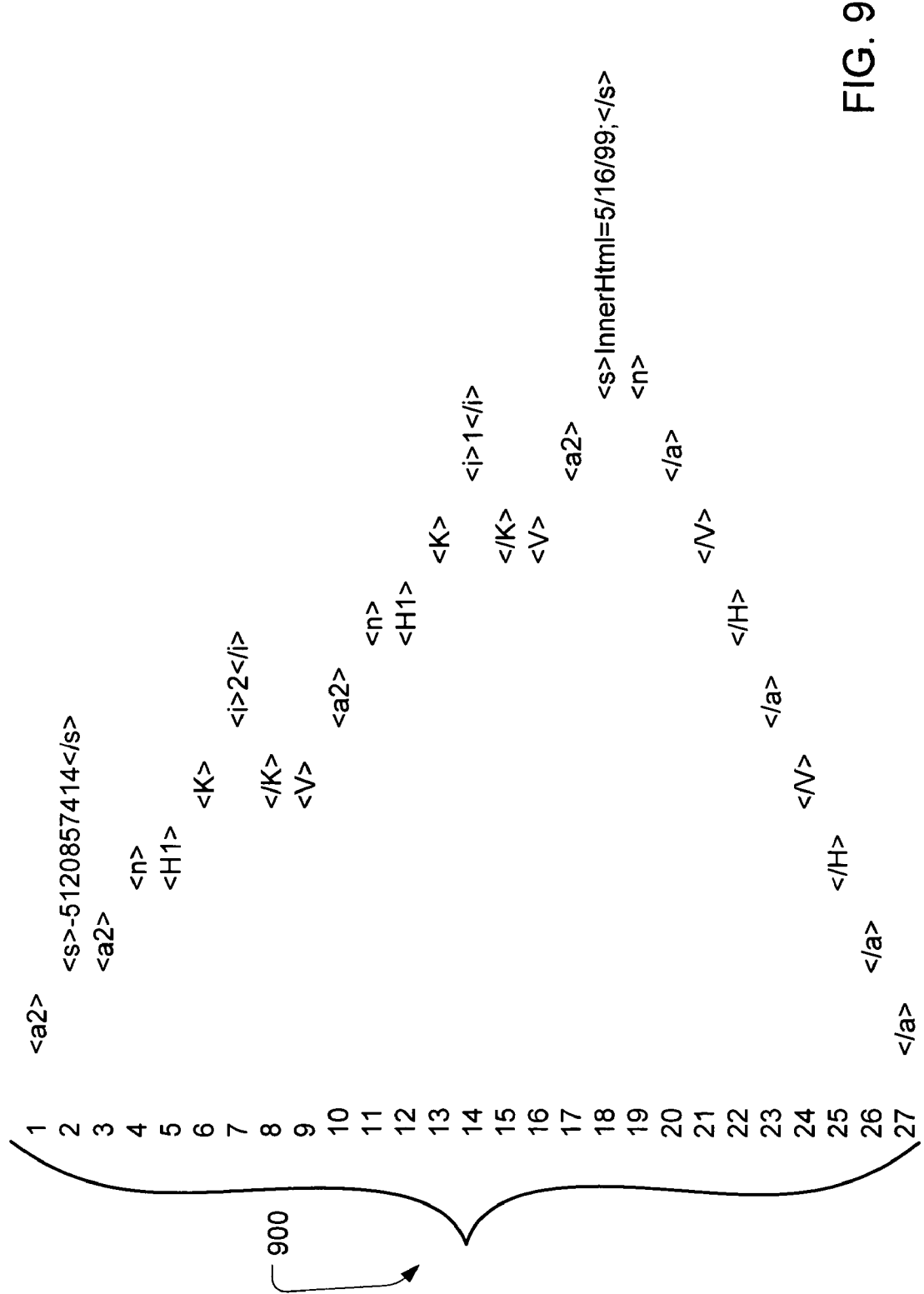
FIG. 9 illustrates a nested version of the _VIEWSTATE field value of FIG. 7.

FIG. 9 illustrates a nested version of the _VIEWSTATE field value of FIG. 7. The nested version is depicted herein to facilitate discussion of the hierarchical nature of the _VIEWSTATE field. Line 1 of the nested version 900 corresponds to the beginning of the nested file check block 802 of FIG. 8. Line 1 specifies a two-element array, comprising a string on line 2 as the first element and a two-element array of line 3 as the second element. Line 2 specifies a string value representing a file check code. In an embodiment to the present invention, the file check code is calculated as a hash value of the associated ASP+ resource (e.g., ASP+ resource 600 of FIG. 6). The array started on line 3 represents the beginning of state information for the next level of hierarchy, namely the page control object 804 of FIG. 8. The null value on line 4 represents the first element of the two-element array of line 3, which is capable of holding state information relating to properties of the page object itself. In the illustrated embodiment, no state information is recorded for the page object, so the value equals "null".

As shown in line 5, the second element of the two-element array of line 3 indicates a hash table including state information for the page control object's children (namely, control objects 806, 808, 810 and 812 of FIG. 8). The hash table of line 5 includes one hash table entry, as indicated by the "1" in the tag <H1>. The <K>, </K> tags on lines 6 and 8 encompass the key for the hash table entry, namely the integer value "2" indicated in line 7, which corresponds to the index of the form control object 810 of FIG. 8. The _VIEWSTATE value depicted in FIG. 9 includes no state information for the literal control objects 806, 808, and 812 of FIG. 8. Alternatively, if other control objects having saved state information or child control objects existed at the same level of hierarchy as the form control object 810, then the hash table at this level may have more than one hash table entry to accommodate the additional control objects at this level, and the key to each additional hash table entry would be the index of the corresponding control object.

The value of the hash table entry is encompassed by the <V>, </V> tags of lines 9 and 24 and includes another two-element array to define the state of the form control object and its children. The first element of the array specifies the saved state information for the form control object (i.e., represented by a null value in this embodiment).

The second element specifies another one-entry hash table representing the state information for the children of the form control object. The <K>, </K> tags on lines 13 and 15 encompass the key for the single hash table entry, namely the integer value "1" indicated in line 14, which corresponds to the index of the label control object 816 of FIG. 8. The _VIEWSTATE value depicted in FIG. 9 includes no state information for the literal control objects 814, and 818 of FIG. 8.

The value of the hash table entry is encompassed by the <V>, </V> tags of lines 16 and 21 and includes another two-element array to define the state of the label control object and its children. The first element of the array specifies the saved state information for a property of the label control object, which is the string value "InnerHtml=5/16/99" specified in line 18. The property name, "InnerHtml" equals the state value "5/16/99" and is of type "string". The semicolon represents the end of the state value for a given property. If the label control object of line 18 included additional properties for which the state was saved, each state data value and its associated property would be delimited by an ending semicolon. The null value indicated in line 19 as in the second element of the array indicates that label control object does not contain any children. The lines 20–27 represent closing tags for preceding starting tags in FIG. 9.

In an alternative embodiment, a serialization format called Limited Object Serialization (LOS) format is used in a transportable state structure. In general, LOS format specifies a hash table of name/value pairs for each control object, wherein each hash entry contains either state information for a property of the control object or a nested hash table of a child control object.

Table 2 illustrates an exemplary grammar of the LOS format.

TABLE 2

| Token | Grammar | Example |
|---|---|---|
| control object | value type-table$_{opt}$ name-table$_{opt}$ | h<name1;value1>\t50System.Drawing.Color\n1BackColor |
| value | typed-value | 50<red> |
|  | untyped-value | <red> |
|  | typed-array-value | a50<red;blue;green> |
|  | untyped-array-value | a<red;blue;green> |
|  | untyped-hashtable-value | h<name1;value1> |
| typed-value | type-ref value-list-start value-ref value-list-end | 50<red> |
| typed-array-value | array-modifier type-ref value-list-start array-value-ref value-list-end | a50<red;blue;green> |
| untyped-value | value-ref | <red> |
| untyped-array-value | array-modifier value-list-start array-value-ref value-list-end | a<red;blue;green> |
| value-list-start | < |  |
| value-list-end | > |  |
| value-list-separator | ; |  |
| array-modifier | a |  |
| hashtable-modifier | h |  |
| untyped-hashtable-value | hashtable-modifier value-list-start hashtable-value-ref value-list-end | h<name1;value1> |
| value-ref | string-value | \"This is a string value.\" |
|  | bin-ref base64-persisted-object |  |
| bin-ref | escape-char b | \b |
| array-value-ref | value$_1$;[value$_2$;[value$_n$]] | red;blue;green |
| hashtable-value-ref | name-ref$_1$;value$_1$[value-list-separator name-ref$_2$;value$_2$[value-list-separator name-ref$_n$;value$_n$]] | <name1;value1; name2;value2; name3;value3> |
| name-ref | string-name-number | 1 |
|  | string-name | BackColor |
| type-ref | known-type-number | 10 |
|  | string-type-number | 50 |
|  | string-type | System.Drawing.Color |
| type-table | type-table-start string-type-number$_1$ string-type$_1$[value-list-separator string-type-number$_2$ string-type$_2$[value-list-separator string-type-number$_n$ string-type$_n$;]] | \t50System.Drawing.Color;51System.Drawing.Font |
| name-table | name-table-start string-number$_1$ string-name$_1$[value-list-separator string-name-number$_2$ string- | \n1BackColor;2ForeColor |

TABLE 2-continued

| Token | Grammar | Example |
|---|---|---|
| | name$_2$[value-list-separator string-name-number$_n$ string-name$_n$;]] | |
| known-type-number | 0 1 2 3 4 5 6 7 8 9<br>10 11 12 13 14 15 16 17 18 19<br>20 21 22 23 24 25 26 27 28 29<br>30 31 32 33 34 35 36 37 38 39<br>40 41 42 43 44 45 46 47 48 49 | |
| type-table-start | escape-char t | \t |
| name-table-start | escape-char n | \n |
| string-terminator-char | value-list-separator value-list-end' | ' " "\ |
| escaped-string | escape-char string-terminator-char | \" |
| escape-char | \ | |
| string-number | 0 1 2 3 4 5 6 7 8 9 | |
| base64-persisted-object | Any object that is BinarySerialized and then base64 encoded | |
| string-name | Any string that is set off by a string delimiter | |
| string-type | Any string that matches a COM+ class name and that is set off by a string delimiter | |
| string-value | Any string that is set off by a string delimiter that can be converted using the type's TypeConverter | |

As a first example of how the LOS format may be used, consider the entry:

h<name1;value1;name2;value with \; escaped\> \"characters\"> which defines a hash table of 2 name/value pairs, wherein the values are all strings. The first value is named "name1" and equals the string "value1". The second value is named "name2" and equals the string "value with; escaped> "characters"".

As a second example of how LOS format may be used, consider the entry:

h<control1;h<1;50<blue>;text;hello>control2;h<1;50<red>;control3;>\t50System.Drawing.Color\n1BackColor which defines a hash table having three hash entries: "control1", "control2", and "control3". The first hash entry is named "control1" and includes a child hash table having two entries, which are name/value pairs. The name of the first entry in the control1 hash table uses the index "1" to reference the name "BackColor", which is defined at the end of the example. The value of the first entry equals "blue" and is of type "System.Drawing.Color", which is specified by the index "50" and defined near the end of the example. The name/value pair of the second entry in the control1 hash table includes the name "text" and the value "hello". The "control2" hash entry includes child hash table having one hash entry, which also uses the index "1" to reference the name "BackColor". The value equals "red" and is of type "System.Drawing.Color". The "control3" hash table is empty. In a manner similar to that of the previously disclosed embodiment, hierarchy is specified by the nesting of the hash tables; however, other methods of describing hierarchy are contemplated within the scope of the present invention, including the use of hierarchical identifiers.

Figure 10:
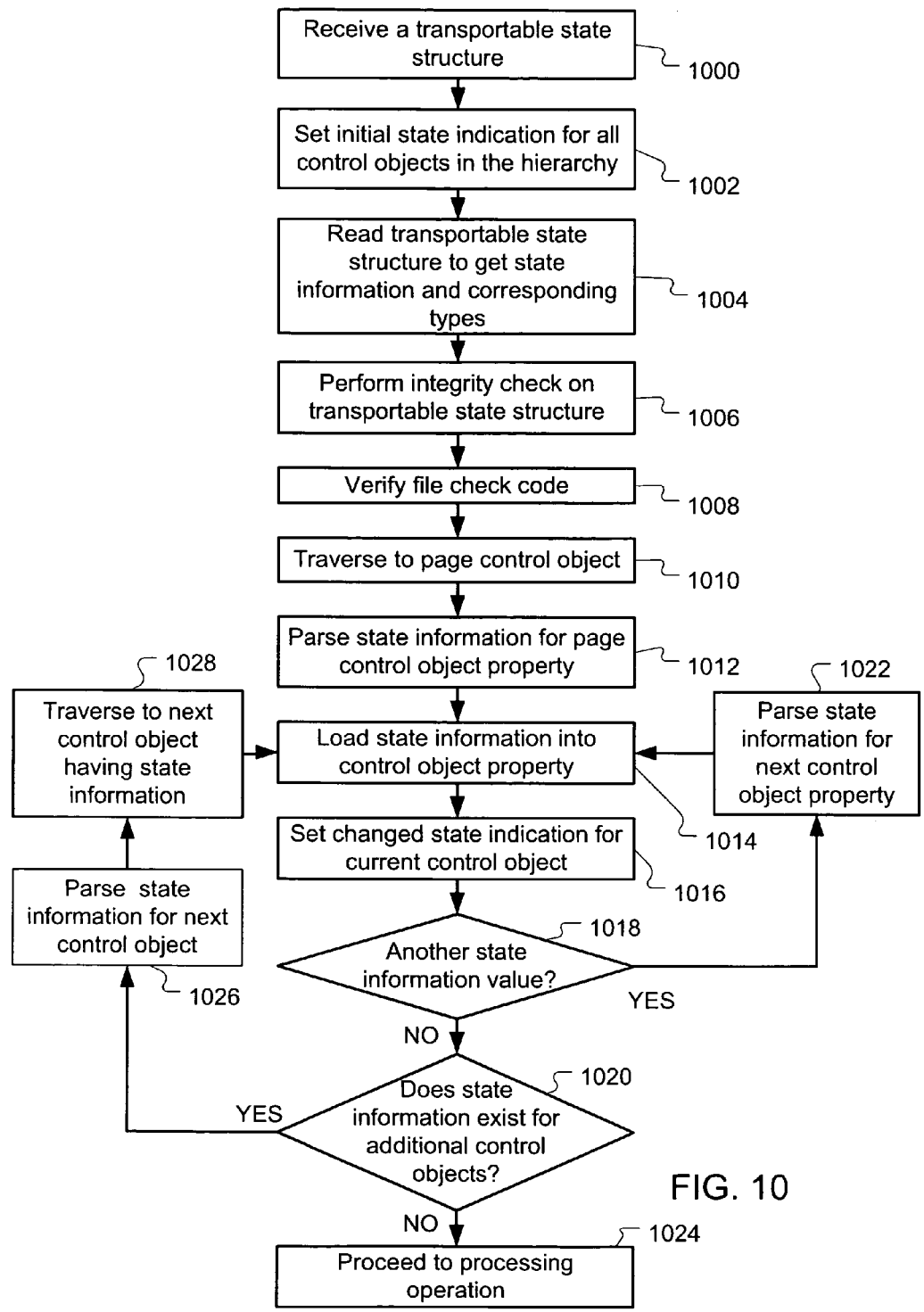
FIG. 10 illustrates a process flow diagram for receiving a transportable state structure and loading state information stored therein into control objects of a control object hierarchy in an embodiment of the present invention.

FIG. 10 illustrates a process flow diagram for receiving a transportable state structure and loading state information stored therein into control objects of a control object hierarchy in an embodiment of the present invention. In the illustrated embodiment, a transportable state structure may not be sent from the server (and, therefore, not returned to the server by the client) unless at least one property changed for at least one server-side control object. As such, the illustrated flow diagram assumes that at least one element of state information exists in the received transportable state structure. In an alternative embodiment, the transportable state structure may be round-tripped between the server and the client, even if no state information exists therein. In such embodiment, a decision operation (not shown) could operate to abort the state management process if no state information exists in the transportable state structure.

Receiving operation 1000 receives a transportable state structure from a client, such as in an HTTP request. Marking operation 1002 sets an initial state indication for all control objects in the server-side hierarchy. Reading operation 1004 reads the received transportable state structure to extract the state information and corresponding property types.

Checking operation 1006 performs an integrity check on the transportable state structure (e.g., using the _VIEWSTATEMAC Value). In an embodiment of the present invention, checking operation 1006 involves (1) reading a received integrity code from the transportable state structure; (2) calculating an integrity code of its own from at least the state information included in the transportable state structure; and (3) comparing the received integrity code with the newly calculated integrity code to determine if the transportable state structure has been corrupted during the round trip to the client. If the transportable state structure is determined to be corrupted, the server-side code can respond to handle the exception, including by aborting the load operation, continuing with processing in the absence of state information or raising an error.

A verification operation 1008 verifies the file check code included in the transportable state structure. In an embodiment of the present invention, verification operation 1008 includes (1) reading the received file check code from the _VIEWSTATE field; (2) calculating its own file check code from at least the contents of the ASP+ resource store on the server; (3) and comparing the received file check code with the newly calculated from file check code to determine whether the state information in the transportable state structure corresponds to the same version of the ASP+ resource on the server. Verification operation 1008 is used to verify that the ASP+ resource on the server did not change during the transportable state structure's round trip to the client. If the ASP+ resource on the server did change, then the server may discard the received state information, abort the load operation and/or signal an error to the client. In one embodiment, the control object hierarchy is created in its initial state and the load operation is aborted before the server proceeds with processing the request. Traversing operation 1010 traverses to the page control object of the server-side control object hierarchy.

Parsing operation 1012 parses state information for a control object hierarchy corresponding to a control object in the nested _VIEWSTATE field. In the first iteration, the corresponding control object is the page control object traversed to in traversing operation 1010. In subsequent iterations, the corresponding control object is a descendant control object of the page control object and is located by the traversal operation 1028. The parsing operation 1012 may extract a state value and convert the value, which is initially in a string format when it is parsed, into the given property type. Loading operation 1014 loads the state information parsed from the _VIEWSTATE value into a property of a control object. Indicating operation 1016 sets a change state indication for the current control object. This indication may be later used to only save the state of those control objects in which the state has changed from an initial state, thereby minimizing the size of the transportable state structure. Alternatively, all state information may be saved. During postback data handling, postback event handling, and data binding operations in the control object hierarchy, changes made to the state of a control object may also result in the setting of the changed state indication for individual control objects. In an embodiment of the present invention, however, any data change indication that is set due to data binding operations is reset so that the state of that property is not recorded in the transportable state structure, thereby further minimizing the size of the transportable state structure. The state of such a property is dependent on the data specified by the binding relationship, which will be updated in the data binding operation 512 of FIG. 5.

Decision operation 1018 directs processing to operation 1022, if additional state information exists for the current control object. If so, operation 1022 parses the state information for the next control object property in the current control object and directs processing to operation 1014. If no additional state information is available for the current control object, decision operation 1018 directs processing to decision operation 1020, which directs processing to processing operation 1024 if no other control object state information is available in the _VIEWSTATE value. If decision operation 1020 determines that additional control objects exist for which states have not been processed, processing proceeds to operation 1026, which parses the state information for the next control object from the _VIEWSTATE value. Traversing operation 1028 traverses to the next control object corresponding to the new state information parsed in operation 1026. Thereafter, processing proceeds to loading operation 1014. The recursive parsing operations of FIG. 10 implement a deserializing operation in an embodiment of the presenting invention.

Figure 11:
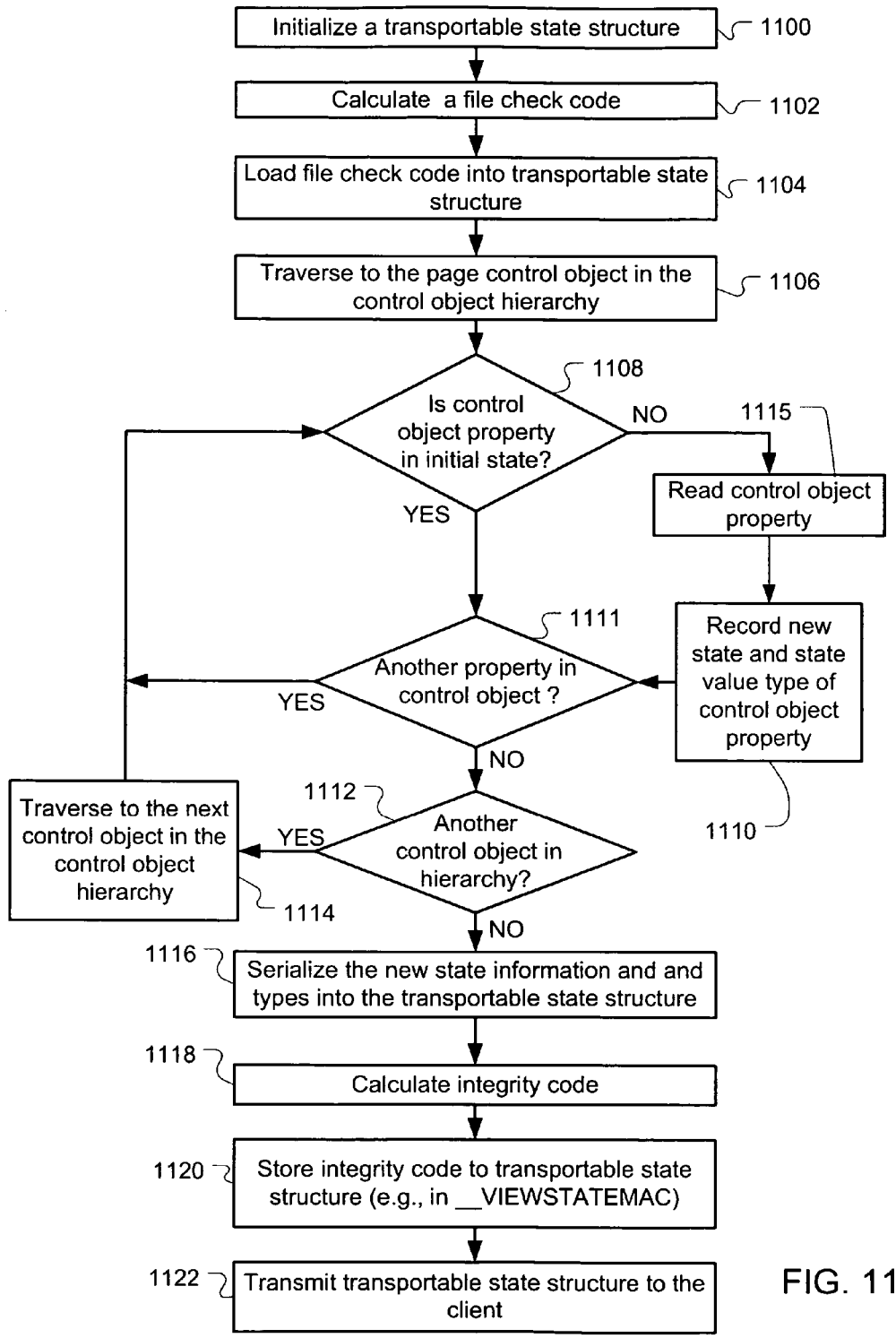
FIG. 11 illustrates a process flow diagram for saving state information from control objects of a control object hierarchy into a transportable state structure for transmission to the client in an embodiment of the present invention.

FIG. 11 illustrates a process flow diagram for saving state information from control objects of a control object hierarchy into a transportable state structure for transmission to the client in an embodiment of the present invention. Initializing operation 1100 initializes a transportable state structure. Calculating operation 1102 calculates a file check code based on the current version of the ASP+ resource. In an embodiment of the present invention, the file check code is based on a hash algorithm (e.g., MD5 or other) of the ASP+ resource contents, such as merely hashing the file's contents or some specified component of the file. Loading operation 1104 loads the calculated file check code into the transportable state structure. Traversing operation 1106 traverses to the page object in the control object hierarchy.

In an embodiment of the present invention, a server-side control object can be created with a "MaintainState" property, which indicates whether the property values of the control object (and its children) should be saved into the transportable state structure. If not, the traversal operation 1106 may skip the server-side control object and its children in this process. Otherwise, if the state of the control object is to be maintained in accordance with the "MaintainState" property, then the traversal operation 1106 will traverse into the control object.

Decision operation 1108 directs processing to reading operation 1115, which reads the new state value and its type from the control object property. Operation 1110 records the new state value and its type before proceeding to operation 1111. For the purposes of this discussion, if no property exists within the current control object, the property is represented by a "null" value in the _VIEWSTATE field. If the current control object's property is still in its initial state in operation 1108, processing proceeds to decision operation 1111. If another property exists within the current control object in operation 1111, processing proceeds to decision operation 1108.

If no other property exists in the current control object in operation 1111, processing proceeds to decision operation 1112, which directs processing to traversal operation 1114 if another control object exists in the hierarchy. Traversal operation 1114 traverses to the next control object in the control object hierarchy and proceeds to decision operation 1108 to access the control object's property. If no other control object exists in the hierarchy in operation 1112, processing proceeds to serializing operation 1116 which serializes the new state information (including state value types) obtained in the previous operations and stores them into the transportable state structure. Operation 1118 calculates an integrity code (such as by using an MD5 algorithm), and operation 1120 stores the integrity code into the transportable state structure, such as in the _VIEWSTATEMAC field. It should be understood that the integrity code operations and the filed check code operations are optional and may be omitted in an alternative embodiment of the present invention. Operation 1122 transmits the transportable state structure to the client, such as in an HTTP response containing the rendered HTML code generated by the control object hierarchy.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of embodiment of the invention. Since many embodiments of the invention can be made without departing from the spirit and scope of the invention, the invention resides in the claims hereinafter appended.

We claim:

1. A method executed on a computer system for managing a state of a server-side control object corresponding to a client-side user interface element incorporated in a web page displayed on a client, the method comprising:
   creating the server-side control object to process the client-side user interface element;
   receiving from the client a transportable state structure including state information indicating a state value for at least the one server-side control object;
   loading the state value from the state information into a property of the server-side control object, if the state value is associated with the server-side control object;
   initializing a property of the server-side control object to have an initial state;
   setting an indication to represent that the state of the property of the server-side control object is unchanged from the initial state;
   changing the indication to represent that the property of the server-side control object has changed from the initial state, if the property was loaded with the state value from the transportable state structure;
   traversing each server-side control object in a control object hierarchy; and
   storing the state information of the server-side control object into the transportable state structure for transmission back to the client, if the indication represents that the state information of the server-side control object has changed from its initial state.

2. The method of claim 1 wherein the loading operation comprises:
   locating the server-side control object based on hierarchical location within the transportable state structure;
   traversing the hierarchical location of the server-side control object; and
   storing the state value into the property of the server-side control object.

3. The method of claim 1 wherein the transportable state structure further includes a received integrity code, and further comprising:
   reading the received integrity code from the transportable state structure;
   calculating a calculated integrity code from the state information included in the transportable state structure; and
   comparing the received integrity code with the calculated integrity code to determine whether the transportable state structure is still valid.

4. The method of claim 1 further comprising:
   setting the indication to indicate that the property of the server-side control object is unchanged from the initial state, if the property is data bound to a field of a server-side database.

5. The method of claim 1 further comprising:
   transmitting the transportable state structure to the client in a response with authoring language data defining the web page.

6. The method of claim 1 further comprising:
   calculating an integrity code from the state information included in the transportable state structure, responsive to the operation of storing the state information;
   storing the integrity code in the transportable state structure; and
   transmitting the transportable state structure to the client in a response with authoring language data defining the web page.

7. The method of claim 1 further comprising:
   generating authoring language code defining at least a portion of the web page from the at least one server-side control object.

8. A physical computer storage medium readable by a computer system and encoding a computer program for executing a computer process that manages a state of a server-side control object corresponding to a client-side user interface element incorporated in a web page displayed on a client, the computer process comprising:
   creating the server-side control object to process the client-side user interface element;
   generating a state value from the service-side control object responsive to data received from the client;
   loading the state value into a transportable state structure;
   sending the transportable state structure to the client;
   initializing a property of the server-side control object to have an initial state; and
   setting an indication to represent that the property of the server-side control object is unchanged from the initial state;
   wherein the loading operation comprises:
      traversing one or more of the server-side control objects in a control object hierarchy;
      for each server-side control object, extracting a property value from the server-side control object associated with the indication representing that the state of the server-side control object has changed from its initial state; and
      serializing the property value into the transportable state structure with the property values from other server-side control objects in the control object hierarchy for transmission back to the client.

9. The computer storage medium of claim 8 wherein the computer process further comprises:
   terminating the server-side control object; and
   receiving the state value from the client in a transportable state structure.

10. The computer storage medium of claim 8 wherein generating operation comprises:
    changing the indication to represent that the property of the server-side control object has changed from the initial state, if the property was loaded with the state value from the transportable state structure.

11. The computer storage medium of claim 8 wherein the loading operation further comprises:
    extracting a property data type from the server-side control object associated with the property value; and
    serializing the property data type into the transportable state structure with the property value of the server-side control object for transmission back to the client.

12. The computer storage medium of claim 11 wherein the loading operation further comprises:
    storing into the transportable state structure hierarchical information relating to the server-side control object in the control object hierarchy for transmission to the client.

13. The computer storage medium of claim 11 wherein the computer process further comprises:
    calculating an integrity code from the state information stored in the transportable state structure, responsive to the serializing operation; and
    storing the integrity code in the transportable state structure.

14. The computer storage medium of claim 8 wherein the transportable state structure is sent in a response with authoring language data defining a web page.

* * * * *